United States Patent
Zaitsev et al.

(10) Patent No.: US 11,847,352 B1
(45) Date of Patent: Dec. 19, 2023

(54) PARENT CHILD REQUEST RECOVERY TO IMPROVE STABILITY

(71) Applicant: Ridgeline, Inc., Incline Village, NV (US)

(72) Inventors: Timophey Zaitsev, Incline Village, NV (US); Hayden Ray Hudgins, Reno, NV (US)

(73) Assignee: Ridgeline, Inc., Incline Village, NV (US)

(*) Notice: Subject to any disclaimer, the term of this patent is extended or adjusted under 35 U.S.C. 154(b) by 0 days.

(21) Appl. No.: 17/584,192

(22) Filed: Jan. 25, 2022

Related U.S. Application Data

(60) Provisional application No. 63/247,138, filed on Sep. 22, 2021.

(51) Int. Cl.
    *G06F 3/06*      (2006.01)

(52) U.S. Cl.
    CPC .......... *G06F 3/0659* (2013.01); *G06F 3/061* (2013.01); *G06F 3/067* (2013.01)

(58) Field of Classification Search
    CPC ......... G06F 3/0659; G06F 3/061; G06F 3/067
    See application file for complete search history.

(56) References Cited

U.S. PATENT DOCUMENTS

| | | | | |
|---|---|---|---|---|
| 6,859,798 | B1* | 2/2005 | Bedell | G06N 5/02 706/45 |
| 8,001,085 | B1* | 8/2011 | Kiselev | G06F 11/2071 707/649 |
| 2002/0134832 | A1* | 9/2002 | Nishimura | G07F 7/1008 235/381 |
| 2007/0022249 | A1* | 1/2007 | Togawa | G06F 9/4843 711/123 |
| 2008/0270421 | A1* | 10/2008 | Ushiyama | H04N 21/637 |
| 2018/0077219 | A1* | 3/2018 | Tan | H04N 21/21815 |
| 2020/0065271 | A1* | 2/2020 | Adiletta | G06F 13/385 |
| 2020/0117590 | A1* | 4/2020 | Brandt | G06F 12/0246 |
| 2020/0192315 | A1* | 6/2020 | LaMoore | G06F 13/4282 |
| 2020/0233764 | A1* | 7/2020 | Danilov | G06F 11/1469 |
| 2021/0160340 | A1* | 5/2021 | Narayanan | H04L 67/561 |
| 2021/0216552 | A1* | 7/2021 | Gale | G06F 16/283 |
| 2022/0075757 | A1* | 3/2022 | Huang | G06F 16/1844 |
| 2022/0407845 | A1* | 12/2022 | El Soussi | H04L 9/0833 |

\* cited by examiner

*Primary Examiner* — Nanci N Wong
(74) *Attorney, Agent, or Firm* — Van Pelt, Yi & James LLP

(57) ABSTRACT

A system, method, and device for providing information between a parent node and a child node is disclosed. The method includes issuing, by a parent node to a child node, an identifier and a set of storage locations, the identifier and the set of storage locations being issued in connection with the parent node instructing the child node to perform an operation, determining, by the parent node, whether a response pertaining to the operation has been received from the child node within a predetermined period of time, in response to a determination that the parent node has not received the response from the child node within the predefined period of time, checking the set of storage locations for a response associated with the identifier.

20 Claims, 8 Drawing Sheets

PARENT CHILD REQUEST RECOVERY TO IMPROVE STABILITY

CROSS REFERENCE TO OTHER APPLICATIONS

This application claims priority to U.S. Provisional Patent Application No. 63/247,138 entitled PARENT/CHILD REQUEST RECOVERY TO IMPROVE STABILITY filed Sep. 22, 2021 which is incorporated herein by reference for all purposes.

BACKGROUND OF THE INVENTION

A system for big data processing comprises a system for receiving data, storing data, processing data, etc. Big data processing systems typically comprise a large number of elements in one or more datasets. At scale, the number of transactions (e.g., queries) performed with respect to one or more datasets is very large. In connection with performing a particular transaction, big data processing generally distributes processing of operations across various nodes within the system. If an operation corresponding to the transaction fails to communicate its results, successful performance of the system is jeopardized.

BRIEF DESCRIPTION OF THE DRAWINGS

Various embodiments of the invention are disclosed in the following detailed description and the accompanying drawings.

DETAILED DESCRIPTION

Figure 1:
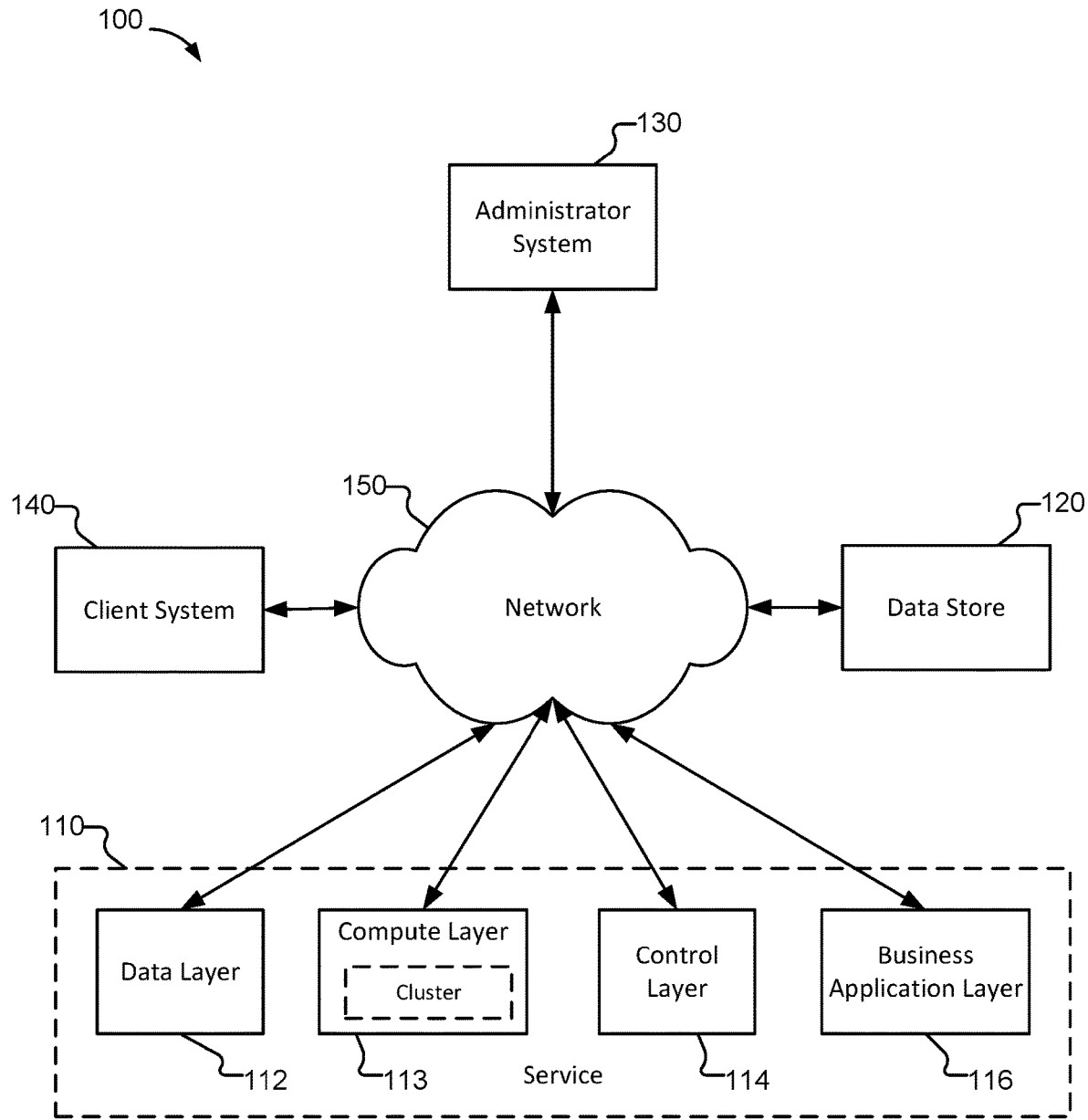
FIG. 1 is a block a diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a child node means a compute node that is specifically configured to have access to a storage. The storage to which a particular child node has access may be a storage location specifically allocated/assigned to particular child node, and other child nodes may not have access to storage locations specifically assigned to the particular child node. In some embodiments, the child node comprises the storage location specifically associated with the child node.

As used herein, a parent node means a node that receives an indication of a transaction, determines a set of operations to perform in connection with completing the transaction, and allocates the set of operations across one or more child nodes. For example, a parent node fans out constituent operations associated with a particular transaction across a plurality of child nodes. In some embodiments, in response to receiving a request to perform a transaction, the parent nodes determines a set of resources to deploy to service the transaction (e.g., a set of child nodes to service corresponding operations), and the parent node may spin up applicable resources. According to various embodiments, the parent node uses a dependency mapping of resources/compute nodes to resources. A parent node may serve as a gateway node to outside systems/services.

According to various embodiments, a system, method, and/or device for communicating information between a parent node and a child node, or for providing a recovery mechanism for such information, is disclosed. The system comprises at least two compute entities, comprising: a parent node and at least one child node. In connection with instructing a first child node of at least one child node to perform a first operation, the parent node issues to the first child node an identifier and/or a set of storage locations. The first child node provides the parent node with a response to the first operation over a primary communication channel, and stores the response in at least one storage location of the set of storage locations, the response being stored in association with the identifier. In response to a determination that the parent node did not receive the response from the first child node within a predetermined period of time, the parent node checks the set of storage locations for the response associated with the identifier. In some embodiments, the determination criterion includes a requirement related to a total number of responses received from fanning or other operation assignments.

According to various embodiments, a system, method, and/or device for communicating information between a parent node and a child node, or for providing a recovery mechanism for such information, is disclosed. The system comprises at least two compute entities, comprising: a parent node and at least one child node. In connection with instructing a first child node of at least one child node to perform a first operation, the parent node issues to the first child node an identifier associated with the first operation. The first child node provides the parent node with a response to the first operation over a primary communication channel, and stores the response in at least one storage location of a predetermined set of storage locations, the response being stored in association with the identifier. The parent node proceeds with processing a second operation without waiting for a response to the first operation. In response to a determination that the parent node did not receive the response from the first child node within a predetermined period of time for the first operation, the parent node checks the predetermined set of storage locations for the response associated with the identifier for the first operation and without waiting for a response to the second operation automatically checks a second set of storage locations for a response to the second operation associated with a second identifier.

According to various embodiments, a distributed computing system performs transactions received from other systems such as client systems (e.g., used by users) or a customer system that interfaces with the distributed computing system such as via an application programming interface, etc. In response to receiving a request to perform a transaction, the distributed computing system determines a set of operations to perform in connection with performing the transaction. For example, the system determines a set of operations such that the system obtains a result for the transaction based at least in part on an aggregation (e.g., a compiling based on determined dependencies among the operations) of the respective results of the operations.

In some embodiments, in response to determining the set of operations for a particular transaction, the system allocates the set of operations across a set of nodes. For example, the system determines the set of nodes to which to allocate the set of operations for the transaction, and respectively sends to each set of nodes an indication of the allocation of a corresponding one or more operations to be performed by the set of nodes. As an example, the system sends to a particular node from among the set of nodes a request to perform one or more operations of the set of operations corresponding to a transaction. When a transaction fails, one often assumes that the transaction fails because a compute node (e.g., a child node) failed in determining a response; however, another potential failure mechanism is a transmission failure from the compute node of a response determined by the compute node. Quality of service parameters for distributed computing systems are generally robust and a relatively high number of transactions or operations performed by the distributed computing systems. For example, service level agreements (SLAs) for service providers is generally 99.5% transmission without failure. However, despite the significantly high percentage of successful transmissions/computes for the SLAs, at scale a large number of transactions may fail as a result of a transmission and/or compute failure. For example, if 12 billion transactions occur with respect to a system having 99.5% SLA, the system can have 60 million failures while still satisfying the SLA. Accordingly, even under systems satisfying a 99.5% SLA, a large risk of failure exists, and each failure may cause a customer or user to be inconvenienced.

Various embodiments include a mechanism to improve the resiliency of a distributed computing system. The system comprises a child node that is performing an operation for which a response is to be provided to another node such as a parent node. To ensure that a transmission failure between the child node and the parent node does not result in a failure of the system (e.g., a task or transaction for which the response for the operation is to be used), the system provides a mechanism by which the other node (e.g., the parent node) is able to obtain the response for the operation even if transmission over a primary channel (e.g., a communication channel between the child node and the parent node) fails. The use of such other mechanism to provide the parent node with the response improves the resiliency of the system because the likelihood that failure occurs along two or more paths of providing the response to the parent node is far less than the likelihood that a failure occurs over a single path (e.g., the primary communication path). According to various embodiments, the system ensures that the response for the operation is obtainable over a secondary channel (or secondary mechanism). In some embodiments, the child node stores the response for a particular operation to a predetermined storage location (or a storage location from a set of predetermined locations) in connection with obtaining the response and sending the response to the other node. For example, contemporaneous with the child node sending to a parent the response over a primary communication channel the system (e.g., the child node of the system) stores the response in the predetermined storage location (or a storage location from a set of predetermined locations). In response to a determination that an obtaining of the response for a particular operation over the corresponding primary communication channel fails, the system (e.g., the parent node of the system) determines that the parent node is to obtain the response from the predetermined storage location (or a storage location from a set of predetermined locations). The system may attempt to communicate the response over a primary communication channel in connection with the child node storing the response in the set of storage locations because attempting to communicate the response over the primary communication channel is more efficient than the parent node checking a storage location. For example, having a direct response to an operation (e.g., communicating the response over the primary communication channel) is more efficient (e.g., less network overhead is incurred) than checking a storage location for a stored response. Saving the response to a storage location is relatively expensive. However, resiliency benefits (e.g., reducing transaction failures) may outweigh the costs associated with storage (and storing information to the storage) for responses determined by child nodes. In addition, if the child node stores the response to a storage location (in addition to communicating the response over the primary communication channel) the parent node does not expend additional resources/effort for such resiliency benefits unless there is a time out or other criteria. In some embodiments, in the event that the parent node does not receive an operation result from a child node and is not able to find a response in a storage location, the parent node may cause the operation to be reperformed by the same child node or a different child node. In some embodiments, the parent node will designate the child node that failed to provide a transmitted result or a stored result as potentially defective and/or cause that child node to be decommissioned or shut down.

According to various embodiments, the system determines that obtaining a response for an operation over a primary communication channel failed based at least in part on one or more of (i) a time that has lapsed between when a parent node instructs/requests child node to perform an operation and a current time, (ii) an indication that a child node has communication problems, etc. As an example, the system determines that obtaining the response for a particular operation over the corresponding primary communication channel has failed in response to a determination that the response has not been received (e.g., via the primary communication channel) within a predefined period of time (e.g., a predetermined operation time threshold). The predefined period of time may be set by a user (e.g., a system administrator or an administrator of a customer system), etc. As another example, the system determines that obtaining the response for a particular operation over the corresponding primary communication channel has failed in response to a determination that the child node is deemed to have communication problems. The child node may be deemed to have communication problems based at least in part on historical information pertaining to communication of results to historical operations. For example, if a child node had a previous problem performing a communication (e.g., a communication of one or more responses over a primary communication channel). The child node may be deemed to have a previous problem performing a communication if previous communications from the child node failed in excess of a predetermined threshold number of communication failures (e.g., at least a predetermined number of failures occurred within a threshold period of time).

According to various embodiments, an operation assigned to a child node is associated with an identifier (e.g., a transaction identifier, etc.). As an example, the identifier may be a unique identifier for operations or transactions within a system. As another example, the identifier may be a globally unique identifier in a system (e.g., a distributed computing system). In some embodiments, the identifier is obtained (e.g., determined, generated, etc.) in connection with the assignment of an operation to a node. In response to a parent node determining to allocate an operation to a child node, the parent node obtains or generates an identifier corresponding to the operation. The system (e.g., the parent node) then provides the identifier corresponding to the operation to the child node, and the child node associates the identifier with a response to or result of the operation. For example, in connection with instructing a child node of the at least one child node to perform a first operation, the parent node issues to the child node an identifier, and the child node associates the identifier with the response to the operation (e.g., the child node communicates, or attempts to communicate, the identifier and the response to the operation to the parent node, and the child node stores the response in association with the identifier in at least one storage location of a set of storage locations, etc.).

According to various embodiments, in response to a child node obtaining (e.g., determining, computing, etc.) a response to an operation, the child node provides the parent node with a response to the operation over a primary communication channel (e.g., a communication across a communication bus, a network, a wireless communication link, a fiber link, etc.), and stores the response in at least one storage location of a set of storage locations (e.g., a predetermined set of storage locations). In some embodiments, the child node begins processing a subsequent operation in response to a determination that response is stored in at least one storage location without receiving confirmation from the parent node of receipt of the response via the primary communication channel. For example, the child node assumes that a response to a particular operation is obtained by the parent node in response to an attempt to communicate the response over the primary communication channel. The child node is able to proceed with a second operation in that the response to the first operation is stored in a storage location(s) so it can be recovered in the event that the response is not received by the parent node.

In some embodiments, the response is stored in a location of a set of storage locations that had been provided to the child node at the time or receipt of the operation. The location may be predetermined and an indication of the location of the set of locations may be communicated to the child node in connection with an instruction/request for the child node to perform the operation, or the indication of the set of locations may be provided to the child node in advance. As an example, child nodes within a system may respectively store a set of storage locations to use in connection with providing information (e.g., responses for an operation) to a parent node(s). In some embodiments, at least a subset of the set of storage locations are mapped to a particular node (e.g., a child node and/or a particular child node). In some embodiments, at least a subset of the set of storage locations is mapped to a particular operation (or transaction, etc.). For example, the system (e.g., the parent nodes) determines a particular location on a storage system at which a response is to be stored for a particular operation. In some embodiments, in response to obtaining a result for an operation, the child node stores the response in at least one of the set of storage locations. The child node may store the response in a single storage location of the set of storage locations, or a plurality of storage locations of the set of storage locations. As an example, in response to a determination that storing the response to at least one storage location fails, the child node may re-attempt to store the response to the at least one storage location. As another example, in response to a determination that storing the response to at least one storage location fails, the child node may re-attempt to store the response to a different storage location(s) of the set of storage locations.

According to various embodiments, the system ensures security of information (e.g., information pertaining to the response) stored at a particular storage location. As an example, information stored in a storage location (e.g., of the set of storage locations) is encrypted such as using a key of a key pair that is shared between the parent node and the child node. The parent node and child node may store a key pair in advance (e.g., during configuration of the system, etc.), or the parent node may provide the child node with a key with which to encrypt or to access the storage location. As another example, one or more of the storage locations is known only by the parent node and by child node (e.g., other child nodes or other parent nodes do not know the location of one or more of the set of storage locations). As another example, the system authenticates a node (e.g., a parent node or child node) before permitting a node to access a storage location (e.g., to write or read information at the storage location, etc.). The system may store a mapping of permissions of nodes to storage locations, and the system may query, in connection with authenticating a node, before permitting access to a storage location.

According to various embodiments, information stored by a child node in connection with an operation (e.g., a response for the operation mapped to a corresponding identifier such as a transaction identifier or an operation identifier, etc.) is maintained in the corresponding storage location (e.g., from among the set of storage locations) for sufficient time for the parent node to obtain the information. In response to a determination that a predetermined time period has elapsed (e.g., since the information is stored by the child node), the information is deleted (e.g., flushed from the storage location). The predetermined time period may be configurable such as by a system administrator. In some embodiments, the predetermined time period is set based at least in part on a time period within which a transaction is to be completed (e.g., a transaction with which the operation, or result for the operation, corresponds). As an example, the predetermined time period within which a transaction is to be completed is set based at least in part on a quality of service for the system or for the organization/customer associated with the transaction being processed by the system. In some embodiments, the response is deleted from at least one storage location in response to a determination that a transaction for which the first operation is performed is complete. In some embodiments, the response is maintained in at least one storage location for a predetermined caching period. As an example, the predetermined caching period is 24 hours. The average time period to resolve a request to perform an operation (e.g., to obtain the result for the operation) may be on the order of 30 seconds, thus the predetermined caching period may be sufficiently longer. Various other time periods may be implemented. In some embodiments, the response is deleted from at least one storage location in response to the parent node providing an indication that the parent node no longer needs the response.

According to various embodiments, the system comprises a parent node. The parent node may (i) receive a transaction request, (ii) determine a set of operations to be performed in connection with providing a response to the transaction request, (iii) obtain a dependency map of a plurality of child nodes and resources to provide the operations to and response from, (iv) determine a set of child nodes of the plurality of child nodes to which to send the set of operations based at least in part on the dependency map, (v) communicate a set of instructions to respectively perform an operation in the set of operations to the set of child nodes, and (vi) receive a communication of results from after the performance of the operation. In response to providing the instructions to the set of operations to the set of child nodes, the parent node receives corresponding responses over corresponding primary communication channels (e.g., with a given child node there may be a designated primary communication between the given child node and the parent node), or retrieves a response from one or more storage locations of the set of storage locations (e.g., in response to determining that the communication over the primary communication channel has failed, determining that the primary communication channel has failed in the past or is unreliable, etc.).

According to various embodiments, in response to determining that the communication of a response over the primary communication channel fails, the system determines the set of locations associated with the operation, and the system checks the set of storage locations for the response. The system may determine the set of locations associated with the operation based at least in part on performing a lookup with respect to a mapping of sets of storage locations to operations, a mapping of sets of storage locations to child nodes, a mapping of sets of storage locations to transactions (e.g., transaction to which an operation corresponds), etc. In some embodiments, in response to determining to check the set of storage locations for the response, the parent node may check a plurality of the set of storage locations simultaneously. For example, the parent node may check a plurality of the set of storage locations in parallel. As another example, the parent node may check all storage locations of the set of storage locations in parallel. In some embodiments, in response to determining to check the set of storage locations for the response, the parent node checks for the response in the set of storage locations in a particular order. As an example, the particular order may be predetermined (e.g., preset such as based on a set of rules or based on an administrator setting). As an example, the particular order may be determined based on an expectation (e.g., expected likelihood) that a response is stored in a particular storage location. For example, the parent node checks a first storage location (e.g., from among the set of storage location) before a second storage location in response to determining that the expectation (e.g., the expected likelihood) that the response is stored in the first storage location is greater than the expectation (e.g., the expected likelihood) that the response is stored in the second storage location. The parent node may sequentially check the storage locations in the set of storage locations in an order of expected likelihoods that the response is stored in a particular storage location. The order in which the parent node checks the set of storage locations for a response is determined based on a type of operation or expected response to the operation (e.g., a size of the response, a type of file of the response, etc.). According to various embodiments, the expected likelihood that a response is stored in a particular storage location is determined based at least in part on a type of operation and/or a type of expected result for the operation.

In some embodiments, the system (e.g., the parent node) anticipates or skips checking a particular storage location of the set of storage locations. The system (e.g., the parent node) may deem that the child node is not expected to store an expected result in the particular storage location. For example, if the expected likelihood that the child node stores a result in the particular storage location is less than a predetermined expectation threshold, the system deems the child node is not expected to store an expected result in the particular storage location. The system (e.g., the parent node) may determine to skip checking a particular storage location based at least in part on one or more of an attribute (e.g., a size and/or shape) of the request (e.g., the operation subject to the request), an attribute of the expected response (e.g., a size, a type, a file type), an extent of an expectation that the child node is to store the response in the particular storage location, etc. As an example, if the parent node determines a subset of storage locations of the corresponding set of storage locations in which the system expects that the child node was likely to store the response, and the parent node determines that the subset of storage locations does not comprise the response (e.g., a response associated with an identifier matching the identifier for the operation), and the parent node determines that a remaining set of storage locations is not likely to store the response, the parent node determines to skip the remaining set of storage locations and/or resubmit the request to perform the operation. The parent node resubmits the request to perform the operation to the child node or to another child node. For example, the child node stores responses to operations associated with a unique numerically increasing identifier and the parent node determines to find a response associated with an identifier N. In response to seeing responses stored associated with N−2, N−1, N, N+1, N+2, N+3, where the responses are stored in order associated with the identifier, the parent may stop looking for the stored response after seeing responses associated with identifiers N+1, N+2, N+3 and to look earlier in the memory for the response associated with identifier N. In some cases, a response has not been stored and the parent node may, upon reading identifiers that precede and succeed the value of the desired identifier (e.g., N−2, N−1, N+1, N+2, etc.), stop searching for a response associated with the value of the identifier. In some embodiments, this response can be rebuilt from the other stored responses (depending on the mechanisms used).

According to various embodiments, the system uses one or more variables to determine the set of storage locations. Variables used in connection with determining the set of operations include a performance (e.g., time latency), a cost, a system resilience (e.g., how many redundancies are required or desired, etc.), and/or available technology (e.g., available types of storage). In some embodiments, the system implements a cost function with which to determine the set of storage locations (or an order in which the parent node checks the set of storage locations for a response). The cost function may be based on the variables, such as a function in which the variables have a corresponding weighting (e.g., each variable may have its own corresponding weighting). In some embodiments, the system implements a default set of storage locations, and the parent node may override the default set of storage locations in response to one or more criteria being satisfied. As an example, the one or more criteria may pertain to the size and/or shape of the request, a size and/or shape of an expected response for the request, a number of downstream dependencies on the result, etc.

According to various embodiments, the set of storage locations comprises varying locations in a particular storage system and/or varying types of storages. As an example, the set of storage locations comprises a memory associated with a child node (e.g., a cache for the child node, a memory contained or associated in the child node, etc.). As an example, the set of storage locations comprises a blob storage (e.g., a particular location within a blob storage where the blob storage is accessible to a plurality of child nodes and/or plurality of parent nodes, etc.). As an example, the set of storage locations comprises a remote storage service (e.g., Amazon Simple Storage Service™, etc.). As an example, the set of storage locations comprises a column in a data table for requests/operations (e.g., a dataset stored on a particular storage system, etc.). In some embodiments, the system is self-healing with respect to enabling child nodes to store responses in a storage location not comprised in the set of locations. For example, in response to determining that none of the storage locations comprised in the set of storage locations are suitable for storing the response, the system configures the child node to store the response in a different location, and the parent node is informed of the other storage location. In some embodiments, the child node determines whether the set of storage locations comprises suitable location and/or notifying the parent node of the new/different location at which the response is to be stored. In some embodiments, the determination of whether the set of storage locations comprise suitable location and/or notifying the parent node of the new/different location at which the response is to be stored is offloaded to a decider module (e.g., another node comprised in the system). As an example, in response to determining that a request is large (or is likely to comprise a large number of results), the system determines that the child node is to use a blob storage not comprised in the set of storage locations, and the parent node is provide with a location at which the response is stored. The parent node may be provided with the location of a storage location not comprised in the set of locations in connection with the response being communicated to the parent node via the primary communication channel. In some embodiments, in response to receiving an indication/request to perform an operation, a child nodes determines that the operation or corresponding transaction is better suited to generate a report, and the system (e.g., the child node or the parent node) determines to push the transaction to an application programming interface for a reporting service, etc.

According to various embodiments, the system determines whether a transaction associated with the operation has timed out. In response to determining that the transaction has timed out, the system may cease performing the operation. For example, the child node determines that the transaction has timed out in response to receiving an indication of the time out such as from a gateway or a parent node. As another example, the child node determines that the transaction has timed out in response to determining that a current time is later than a threshold time limit for the transaction, or that a compute time has exceeded a threshold transaction time.

Various embodiments improve the resiliency of servicing transactions and/or corresponding operations in a distributed computing system. A cost efficient mechanism (e.g., low additional overhead) is used to ensure that a response for an operation is accessible to a parent node even if a transmission failure occurs between the compute node (e.g., the child node) and the parent node. Accordingly, various embodiments reduce the failure rate of a distributed computing system. For example, various embodiments may ensure that transactions are serviced even in hostile networks or network spaces. In some implementations, the systems disclosed herein support a 100% SLA over hostile networks, such as by having several routes via which a response may be provided from a compute node to a parent node.

FIG. 1 is a block diagram of a network system according to various embodiments of the present application. In the example illustrated in FIG. 1, system 100 includes service 110, data store 120, administrator system 130, and/or client system 140. In some embodiments, service 110 and data store 120 are integrated (e.g., combined into a layer or a single set of server(s)). In some embodiments, service 110 comprises data layer 112, compute layer 113, control layer 114, and/or business application layer 116. System 100 further includes one or more networks such as network 150 over which administrator system 130 and/or client system 140 communicates with service 110 and/or data store 120. In various embodiments, network 150 includes one or more of a wired network, and/or a wireless network such as a cellular network, a wireless local area network (WLAN), or any other appropriate network. In some embodiments, data layer 112, compute layer 113, control layer 114, and/or business application layer 116 are respectively implemented by one or more servers. System 100 may include various other systems or terminals.

According to various embodiments, service 110 comprises data layer 112, compute layer 113, control layer 114, and/or business application layer 116. Service 110 uses data layer 112 and/or compute layer 113 to perform one or more operations corresponding to a transaction. Service 110 uses data layer 112 to access and/or store one or more files with respect to a dataset such as a dataset stored on data store 120. Service 110 also uses data layer 112 to manage (e.g., store, update, etc.) an index of information stored in a dataset (e.g., a mapping of files to locations at which the files are stored, etc.). Service 110 uses control layer 114 as a control plane for a set of one or more services provided by system 100 and/or files stored in data layer 112 and the information pertaining to the set of one or more files, such as metadata for the file(s), a mapping of files to locations (e.g., storage locations).

Control layer 114 receives an indication that service 100 received a request to service a transaction such as a transaction attempting to impact (e.g., access, delete, modify, etc.) a file, such as a file stored in a dataset on data store 120. An example of a transaction may include generating a report pertaining to financial transactions of an organization, a user, etc., or a report pertaining to an organization. Control layer 114 determines to provide the transaction to data layer 112 and/or compute layer 113 to service the transaction.

In response to receiving the transaction (or indication of the transaction), compute layer 113 (e.g., a parent node comprised in compute layer 113) determines a set of resources to deploy to service the transaction. For example, compute layer 113 determines a set of operations to perform in connection with servicing the transaction, and a set of resources (e.g., a set of child nodes) to which to deploy respective operations (or sets of operations). The set of resources may correspond to a cluster of compute nodes. For example, a compute node(s) may be spun up specifically in connection with servicing an operation. In response to the set of child nodes providing the respective responses for the set of operations, the compute layer 113 (e.g., the parent node comprised in compute layer 113).

In response to the parent node determining the set of resources to which to deploy the set of operations, the parent node issues respective instructions to the set of resources for corresponding operations to be performed by such set of resources. For example, with respect to a particular operation, the parent node issues to a child node (e.g., the child node allocated to such operation) an instruction to perform the operation. In connection with issuing the instruction to perform the operation, the parent node provides to the child node an identifier that corresponds to the operation. In some embodiments, the identifier is a unique identifier (e.g., a unique identifier across service 110 or data layer 112 or compute layer 113). The identifier can be associated with the operation or with the transaction to which the operation corresponds. The child node determines (e.g., computes) a response for the operation and provides the response and the identifier for the operation to the parent node. In some embodiments, the providing the response and the identifier for the operation to the parent node comprises (i) communicating the response and the identifier over a primary communication channel, and (ii) storing the response in association with the identifier in at least one storage location of a predetermined set of storage locations. In some embodiments, the child node stores a mapping of predetermined storage location to be used by the child node in connection with providing responses to operations (or specifically for providing responses for operations to a particular parent node). In some embodiments, the parent node provides to the child node an indication of the predetermined set of storage locations to use in connection with providing a response for a particular operation (or a default set of storage locations to use for providing a response to any operation at least from such parent node, etc.). According to various embodiments, in response to the parent node determining that the communication of the response for the operation over the primary communication channel failed, the parent node checks (e.g., queries) the predetermined set of storage locations for the response. For example, the parent node uses the identifier associated with the operation to perform a lookup in one or more of the predetermined set of storage locations for the response for the operation.

According to various embodiments, data layer 112 and/or compute layer 113 deploys two mechanisms for providing responses for operations between two nodes: a communication over a primary communication channel (e.g., such as sending a hypertext transfer protocol (HTTP) response to a HTTP request), and a secondary mechanism such as storing the response in a predetermined storage location (e.g., a data layer 112 location that is accessed by the node requesting the operation in case of failure over the primary communication channel). In response to a determination that obtaining the response for a particular operation over the corresponding primary communication channel fails, compute layer 113 (e.g., the parent node of the system) determines that the parent node is to obtain the response is to be obtained from the predetermined storage location (or a storage location from a set of predetermined locations in data layer 112).

According to various embodiments, compute layer 113 (e.g., the parent node) determines that obtaining a response for the operation over a primary communication channel failed based at least in part on one or more of (i) a time that has lapsed between when a parent node instructs/requests child node to perform an operation and a current time, (ii) an indication that a child node has communication problems, etc. As an example, compute layer 113 determines that obtaining the response for a particular operation over the corresponding primary communication channel fails in response to a determination that the response has not been received (e.g., via the primary communication channel) within a predefined period of time (e.g., a predetermined operation time threshold). The predefined period of time may be set by a user (e.g., a system administrator or an administrator of a customer system), etc. As another example, the system determines that obtaining the response for a particular operation over the corresponding primary communication channel fails in response to a determination that the child node is deemed to have communication problems. The child node may be deemed to have communication problems based at least in part on historical information pertaining to communication of results to historical operations. For example, if a child node had a previous problem performing a communication (e.g., a communication of one or more responses over a primary communication channel). The child node may be deemed to have a previous problem performing a communication if previous communications from the child node failed in excess of a predetermined threshold number of communication failures (e.g., at least a predetermined number of failures occurred within a threshold period of time). In some embodiments, the child node may have completed the result and stored the result but the result sent over the primary communication channel was not received and this situation is deemed a communication failure not a child node computation failure. In some embodiments, the child node may have completed the result, not stored the result and also not sent the result over the primary communication channel and this situation is deemed a computation failure of the child node not a communication failure.

According to various embodiments, compute layer 113 comprises a cluster such as a cluster of compute nodes. Compute layer 113 uses the cluster (or a set of compute nodes within the cluster) to provide responses for a set of operations corresponding to a transaction. In response to receiving the responses for the set of operations, the responses are rolled up (e.g., aggregated) to determine a response for the transaction.

In response to a child node determining a response for an operation, the child node provides the parent node with a response to the operation over a primary communication channel, and stores the response in at least one storage location of a set of storage locations (e.g., a predetermined set of storage locations). In some embodiments, the child node begins processing a subsequent operation (e.g., another operation for another parent node, or another operation pertaining to the transaction) in response to a determination that response is stored in the at least one storage location without receiving confirmation from the parent node of receipt of the response. For example, the child node assumes that a response to a particular operation is obtained by the parent node in response to an attempt to communicate the response over the primary communication channel and the response is stored in a storage location(s) from among the set of storage locations).

According to various embodiments, control layer 114 provides a user interface via which a user discovers and/or accesses a response to a transaction requested of service 110. For example, control layer 114 provides a user interface for a user to discover/access one or more files stored in data layer 112, to set one or more policies or thresholds, etc. As an example, the web interface is provided as a web service such as on a page accessed by a user via administrator system 130 and/or client system 140. In some embodiments, control layer 114 mediates access to a file stored in data layer 112.

According to various embodiments, business application layer 116 provides an interface via which a user (e.g., using client system 140) may interact with various applications such as an application for querying datasets, an application to perform data analysis with respect to data stored in the data store 120, etc. Various other applications can be provided by business application layer 116. For example, a user queries data layer 112 and/or compute layer 113 by sending a query/request to business application layer 116, which interfaces with data layer 112 and/or compute layer 113 to obtain information responsive to the query (e.g., business application layer 116 formats the query according to the applicable syntax and sends the formatted query to data layer 112 and/or compute layer 113). As another example, an administrator uses an interface provided/configured by business application layer 116 to configure (e.g., define) one or more security policies include access permissions to files and/or one or more policies pertaining to storage locations to be used to store responses for operations (e.g., a mapping of storage locations to types of operations, a mapping of storage locations to locations of information used to determine a response to an operation, etc.), one or more thresholds or policies pertaining to a mechanism by which a parent node is able to obtain the response for an operation even if transmission over a primary channel (e.g., a communication channel between the child node and the parent node) fails.

According to various embodiments, data store 120 stores raw data such as source data that is used to determine a feature or in applying a model. Data store 120 stores one or more files pertaining to a dataset.

According to various embodiments, system 100 comprises an administrator system 130 for use by an administrator such as an administrator of service 110 or an administrator for a customer of service 110. For example, administrator system 130 comprises a system for communication, data access, computation, etc. An administrator uses administrator system 130 to maintain data store 120 (e.g. maintain raw data or files comprised in data store 120) and/or one or more policies or thresholds (e.g., time thresholds, etc.). Administrator system 130 communicates with service 110 via a web-interface. For example, administrator system 130 communicates with service 110 via a web-browser installed on administrator system 130. As an example, administrator system 130 communicates with service 110 via an application running on administrator system 130.

According to various embodiments, system 100 comprises client system 140. Client system 140 is used by a user to communicate with service 110 and/or data store 120. As an example, client system 140 communicates with service 110 via a web-interface. In some embodiments, a user uses client system 140 to modify a file at data store 120, to update one or more policies stored at service 110, to communicate with data layer 112, compute layer 113, control layer 114, and/or business application layer 116, etc.

In some embodiments, data layer 112, compute layer 113, control layer 114, and/or business application layer 116 are implemented on a single server or a plurality of servers. For example, control layer 114 and data layer 112 are different modules running on the same server or set of servers. In some embodiments, service 110, and/or data store 120 are implemented on a single server or a plurality of servers.

Figure 2A:
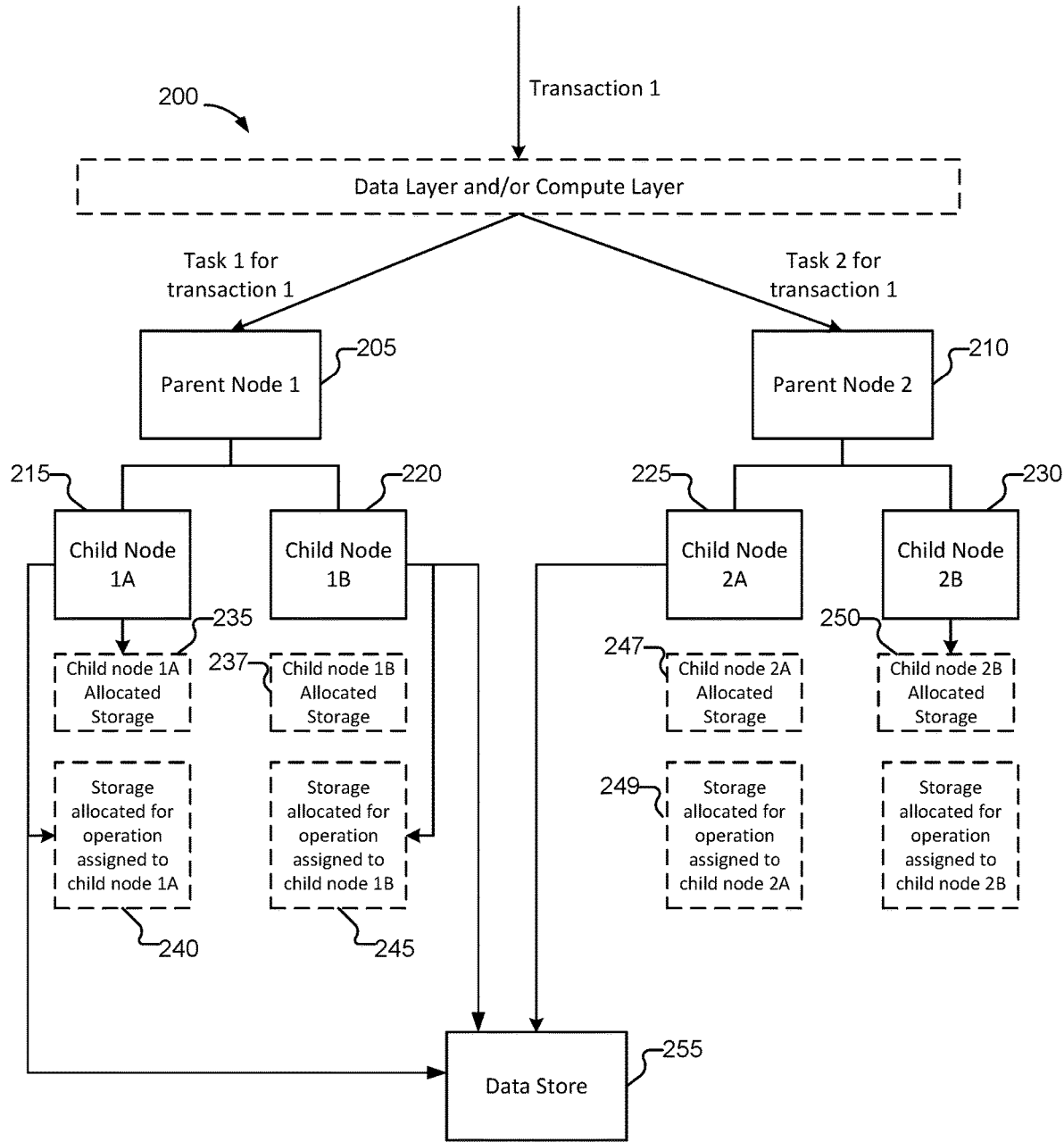
FIG. 2A is a diagram of an example of a parent node-child node relationship according to various embodiments of the present application.

FIG. 2A is a diagram of an example of a parent node-child node relationship according to various embodiments of the present application. In some embodiments, system 200 comprises or corresponds to service 110. In some embodiments, system 200 further comprises one or more of data layer 112, compute layer 113, control layer 114, and/or business application layer 116. System 200 may implement at least part of process 500 of FIG. 5, process 600 of FIG. 6, and/or process 700 of FIG. 7.

In the example shown, system 200 uses a set of parent nodes and child nodes in connection with servicing transactions received by system. As illustrated, system 200 receives a transaction (e.g., transaction 1). In some embodiments, system 200 (e.g., data layer 112 and/or compute layer 113) provides the transaction to a particular parent node. In some embodiments, system 200 (e.g., compute layer 112) determines a set of tasks associated with a transaction, and provides respective tasks of the transaction to a corresponding parent node. For example, task 1 for transaction 1 is provided to parent node 1 205 for servicing, and task 2 for transaction 1 is provided to parent node 2 210 for servicing. Although a parent node may service all tasks associated with a transaction, the illustrative example provided below is in the context of different parent nodes (parent node 1 205 and parent node 2 210) servicing different parts (e.g., tasks) of a particular transaction (e.g., transaction 1).

In some embodiments, in response to parent node 1 205 and parent node 2 210 receiving a task (or a transaction), the parent node 1 205 and parent node 2 210 respectively allocate a set of constituent operations to a corresponding set of child nodes. For example, parent node 1 205 determines a set of operations associated with task 1 (e.g., a set of operations to be performed in order to determine a result for the task or transaction). In response to determining the set of operations corresponding to the respective tasks, the parent node 1 205 and parent node 2 210 determines a set of resources (e.g., child nodes) to use in connection with performing the set of operations. As an example, parent node 1 205 determines that child node 1A 215 and child node 1B 220 are to be used to perform the set of operations for task 1; and parent node 2 210 determines that child node 2A 225 and child node 2B 230 are to be used to perform the set of operations for task 2.

According to various embodiments, a child node has an associated storage. In some embodiments, the child node comprises the storage location specifically associated with the child node. As an example, child node 1A is associated with (or comprises) child node 1A allocated storage 235, and child node 2B 230 is associated with (or comprises) child node 2B allocated storage 250.

According to various embodiments, in response to a child node obtaining (e.g., determining, computing, etc.) a response to an operation, the child node provides the parent node with a response to the operation over a primary communication channel, and stores the response in at least one storage location of a set of storage locations (e.g., a predetermined set of storage locations). For example, in response to obtaining a response for the operation, child node 1A 215 communicates the response over primary communication channel 215 to parent node 1 205, and child node 1A 215 stores the response to a storage location child node 1A allocated storage 235, to storage allocated for operation assigned to child node 1A 240 allocated for the task, and to data store 255. As another example, in response to obtaining a response for an operation, child node 1B 220 communicates the response over primary communication channel to parent node 1 205, and child node 1B 220 stores the response to the storage allocated for operation assigned to child node 1B 237. As another example, in response to obtaining a response for an operation, child node 2A 225 communicates the response over primary communication channel to parent node 2 210 and child node 2A 225 stores the response to a storage location child node 2A allocated storage 247, and child node 2A 225 stores the response also to data store 255 such as a remote data service, blob storage, etc. As another example, in response to obtaining a response for an operation, child node 2B 230 communicates the response over primary communication channel to parent node 2 210, and child node 2B 230 stores the response to child node 2B allocated storage 250 allocated to child node 2B 230.

According to various embodiments, in response to obtaining a response to an operation, a child node stores the response in a storage location(s) from among a predetermined set of storage locations in addition to communicating the response to a parent node over a primary communication channel. In some embodiments, the set of storage locations is predetermined and an indication of the set of locations is be communicated to a child node in connection with an instruction/request for a child node to perform an operation, or the indication of the set of locations is be provided to the child node in advance. As an example, the set of storage locations for child node 1A 215, or the performance of the operation by child node 1A 215, comprises (i) child node 1A allocated storage 235, (ii) storage allocated for the operation assigned to child node 1A 240, and (iii) data store 255.

In some embodiments, at least a subset of the set of storage locations are mapped to a particular node (e.g., child node 1A allocated storage 235 is specifically allocated/assigned to child node 1A 215, and child node 2B allocated storage 250 is specifically allocated/assigned to child node 2B 230). In some embodiments, at least a subset of the set of storage locations is mapped to a particular operation (e.g., storage allocated for operation assigned to child node 1A 240 is mapped to the performing of the operation assigned to child node 1A, and storage allocated for operation assigned to child node 1B 245 is mapped to the performing of the corresponding operation assigned to child node 1B 220, etc.). For example, system 200 (e.g., the parent nodes) determines a particular location on a storage system at which a response is to be stored for a particular operation. In some embodiments, in response to obtaining a result for an operation, the child node stores the response in at least one of the set of storage locations. The child node can store the response in a single storage location of the set of storage locations, or a plurality of storage locations of the set of storage locations. In some embodiments, in response to a determination that storing the response to at least one storage location fails, the child node re-attempts to store the response to the at least one storage location. For example, if child node 1B 220 determines that storing the response to storage allocated for operation assigned to child node 1B 245 fails, child node 1B 220 attempts again to store the response to storage allocated for operation assigned to child node 1B 245. In some embodiments, in response to a determination that storing the response to at least one storage location fails, the child node re-attempts to store the response to a different storage location(s) of the set of storage locations. For example, if child node 1B 220 determines that storing the response to storage allocated for operation assigned to child node 1B 245 fails, child node 1B 220 attempts to store the response to data store 255.

According to various embodiments, the set of storage locations comprises a plurality of storage locations, and the child node determines the particular storage location(s) in which to store the response. In some embodiments, the child node selects the storage location(s) based on a predetermined order of the set of storage locations. As an example, the predetermined order is provided by the parent node such as in connection with instructing the child node to perform the operation. As another example, the child node is preconfigured (e.g., instantiated) with the predetermined order (or rule set for determining the storage location in which to store a response). The predetermined order corresponds to a default order of preference for storing a response.

According to various embodiments, the set of storage locations comprises varying locations in a particular storage system and/or varying types of storages. As an example, the set of storage locations comprises a memory associated with a child node (e.g., a cache for the child node, a memory comprised in the child node, such as child node 1A allocated storage 235 associated with child node 1A 215, etc.). As an example, the set of storage locations comprises a blob storage (e.g., a particular location within a blob storage where the blob storage is accessible to a plurality of child nodes and/or plurality of parent nodes, etc.). As an example, the set of storage locations comprises a remote storage service such as data store 255 (e.g., Amazon Simple Storage Service™, etc.). As an example, the set of storage locations comprises a column in a data table for requests/operations (e.g., a dataset stored on a particular storage system, etc., such as storage allocated for operation assigned to child node 1A 240 allocated for the response for the operation assigned to child node 1A 215).

In some embodiments, the system is self-healing with respect to enabling child nodes to store responses in a storage location not comprised in the set of locations. For example, in response to determining that none of the storage locations comprised in the set of storage locations are suitable for storing the response, the system configures the child node to store the response in a different location, and the parent node is informed of the other storage location so that a mapping of stored locations associated with the operation can be updated. In some embodiments, the child node determines whether the set of storage locations comprise suitable location and/or notifying the parent node of the new/different location at which the response is to be stored. In some embodiments, the determination of whether the set of storage locations comprise suitable location and/or notifying the parent node of the new/different location at which the response is to be stored is offloaded to a decider module (e.g., another node comprised in the system). As an example, in response to determining that a request is large (or is likely to comprise a large number of results), the system determines that the child node is to use a blob storage not comprised in the set of storage locations, and the parent node is provide with a location at which the response is stored. The parent node is provided with the location of a storage location not comprised in the set of locations in connection with the response being communicated to the parent node via the primary communication channel. Using system 200 as an illustrative example, if child node 2A 225 determines that child node 2A allocated storage 247 and the storage allocated for the operation assigned to child node 2A 249 are not suitable for storing the response, child node 2A 225 stores the response to data store 255, and parent node 2 210 is provided with an indication that the response to the operation assigned to child node 2A 225 is stored in data store 255. In some embodiments, the new data storage location is stored in one of the set of locations previously designated as a storage location associated with an operation (e.g., as a pointer to the new location so that the parent node does not need to receive a transmission indicating the new storage location). In some embodiments, the parent node can retrieve the new location in the event that a result or response for a given operation has not been received and retrieve the result or response from the new location pointed to in the storage location it had originally associated with the given operation.

In some embodiments, the child node begins processing a subsequent operation in response to a determination that response is stored in the at least one storage location (or other storage location pointed to by the at least one storage location) without receiving confirmation from the parent node of receipt of the response. For example, the child node assumes that a response to a particular operation is obtained by the parent node as communicated over the primary communication channel or by accessing the response stored in or pointed to by a storage location(s) from among the set of storage locations.

According to various embodiments, in response to determining that the communication of a response over the primary communication channel fails, the system determines the set of locations associated with the operation, and the system checks the set of storage locations for the response (or pointer). As an example, if parent node 1 205 determines that communication of a response (e.g., for the operation assigned to child node 1A 215) from child node 1A 215 fails, parent node 1 205 determines to check the set of storage locations for the response. For example, parent node 1 205 checks for the response either in child node 1A allocated storage 235, storage allocated for operation assigned to child node 1A 240, or data store 255, or all either sequentially or in parallel.

According to various embodiments, the parent node determines that obtaining a response for an operation over a primary communication channel failed based at least in part on one or more of (i) a time that has lapsed between when a parent node instructs/requests child node to perform an operation and a current time, (ii) an indication that a child node has communication problems, etc. As an example, the parent node determines that obtaining the response for a particular operation over the corresponding primary communication channel fails in response to a determination that the response has not been received (e.g., via the primary communication channel) within a predefined period of time (e.g., a predetermined operation time threshold). In some embodiments, the predefined period of time is set by a user (e.g., a system administrator or an administrator of a customer system), etc. As another example, the parent node determines that obtaining the response for a particular operation over the corresponding primary communication channel fails in response to a determination that the child node is deemed to have communication problems. In some embodiments, a parent node deems a child node to have communication problems based at least in part on historical information pertaining to communication of results to historical operations. For example, if a child node had a previous problem performing a communication (e.g., a communication of one or more responses over a primary communication channel). In some embodiments, a parent node deems a child node to have a previous problem performing a communication if previous communications from the child node failed in excess of a predetermined threshold number of communication failures (e.g., at least a predetermined number of failures occurred within a threshold period of time).

According to various embodiments, in response to determining that the communication of a response over the primary communication channel fails, the system (e.g., the parent node) determines the set of locations associated with the operation, and the system (e.g., the parent node) checks the set of storage locations for the response. In some embodiments, the parent node determines the set of locations associated with the operation based at least in part on performing a lookup with respect to a mapping of sets of storage locations to operations, a mapping of sets of storage locations to child nodes, a mapping of sets of storage locations to transactions (e.g., transaction to which an operation corresponds), etc. In some embodiments, in response to determining to check the set of storage locations for the response, the parent node checks a plurality of the set of storage locations contemporaneously. For example, the parent node checks a plurality of the set of storage locations in parallel. As another example, the parent node checks all storage locations of the set of storage locations in parallel. In some embodiments, in response to determining to check the set of storage locations for the response, the parent node checks for the response in the set of storage locations in a particular order. The particular order can be predetermined (e.g., preset such as based on a set of rules or based on an administrator setting), or the particular order may be determined based on an expectation (e.g., expected likelihood) that a response is stored in a particular storage location, or a combination of both, etc. For example, the parent node checks a first storage location (e.g., from among the set of storage location) before a second storage location in response to determining that the expectation (e.g., the expected likelihood) that the response is stored in the first storage location is greater than the expectation (e.g., the expected likelihood) that the response is stored in the second storage location. The parent node may sequentially check the storage locations in the set of storage locations in an order of expected likelihoods that the response is stored in a particular storage location. The order in which the parent node checks the set of storage locations for a response is determined based on a type of operation or expected response to the operation (e.g., a size of the response, a type of file of the response, etc.). As an example, if an expected size of a response exceeds a predetermined threshold, the parent node determines the storage locations to check based on capacities of the respective storages such as of the predetermined set of storage locations (e.g., if a capacity of a storage location is less than the expected size of the response, the parent node determines not to perform a lookup with respect to such storage location for the response, or to check that storage location after checking all storage locations having sufficient capacity). According to various embodiments, the expected likelihood that a response is stored in a particular storage location is determined based at least in part on the type of operation and/or the type of expected result for the operation.

In some embodiments, the parent node anticipates or skips checking a particular storage location of the set of storage locations. The parent node deems that the child node is not expected to store an expected result in the particular storage location. For example, if the expected likelihood that the child node stores a result in the particular storage location is less than a predetermined expectation threshold, the system deems the child node is not expected to store an expected result in the particular storage location. The parent node determines to skip checking a particular storage location based at least in part on one or more of an attribute (e.g., a size and/or shape) of the request (e.g., the operation subject to the request), an attribute of the expected response (e.g., a size, a type, a file type), the expectation that the child node is to store the response in the particular storage location, etc. As an example, if the parent node determines a subset of storage locations of the corresponding set of storage locations in which the system expects that the child node was likely to store the response, and the parent node determines that the subset of storage locations does not comprise the response (e.g., a response associated with an identifier matching the identifier for the operation), and the parent node determines that a remaining set of storage locations is not likely to store the response, the parent node determines to skip the remaining set of storage locations and/or resubmit the request to perform the operation. In those cases, the parent node resubmits the request to perform the operation to the child node or to another child node.

Figure 2B:
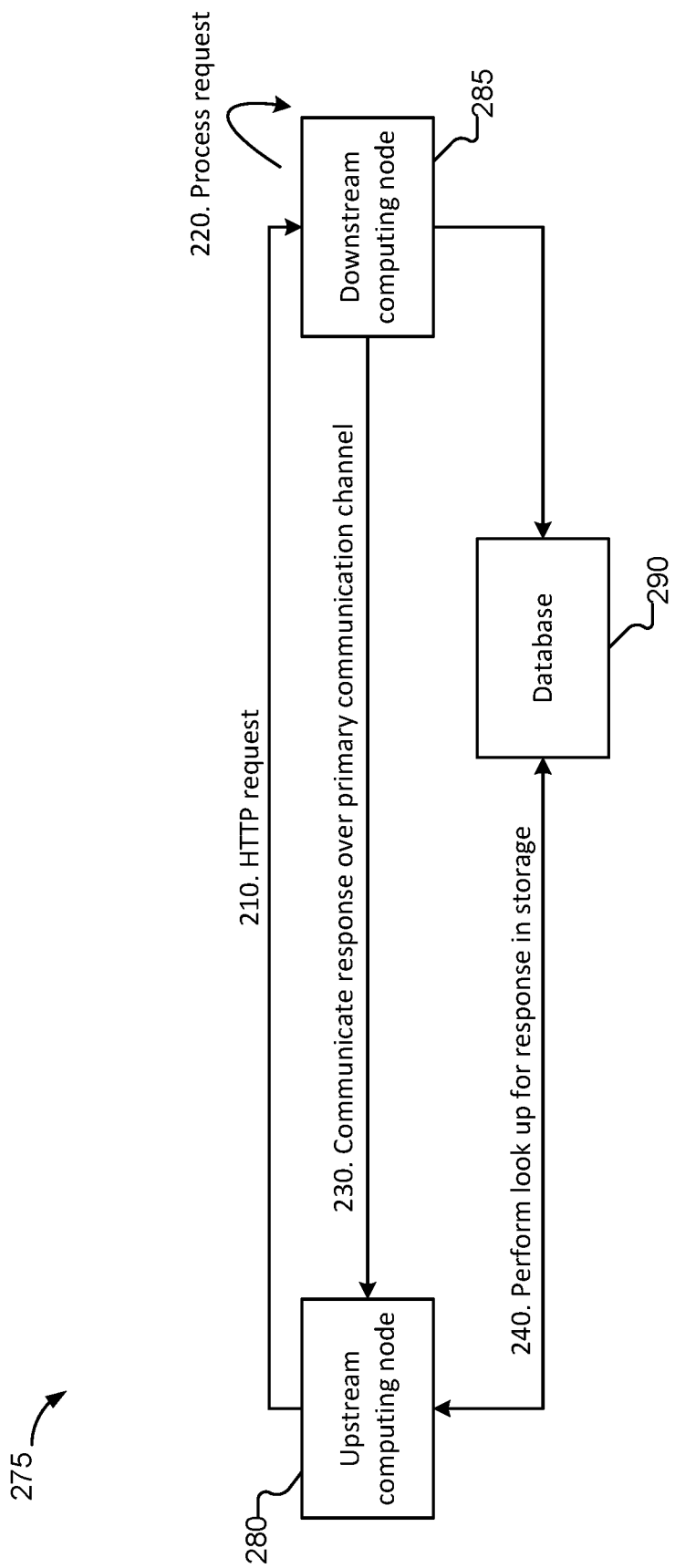
FIG. 2B is a diagram of an example of a request being serviced according to various embodiments of the present application.

FIG. 2B is a diagram of an example of a request being serviced according to various embodiments of the present application. In some embodiments, system 275 comprises or corresponds to service 110. In some embodiments, system 275 further comprises one or more of data layer 112, compute layer 113, control layer 114, and/or business application layer 116. System 275 may implement at least part of process 500 of FIG. 5, process 600 of FIG. 6, and/or process 700 of FIG. 7.

In the example shown, system 275 comprises an upstream computing node 280, a downstream computing node 285, and a storage such as database 290. In some embodiments, system 275 comprises a set of storage locations. In some embodiments, upstream computing node 280 (e.g., a parent node) and downstream computing node 285 (e.g., a child node) are implemented as serverless compute nodes.

At 210, an HTTP request is communicated from upstream computing node 280 to downstream computing node 285. In some embodiments, the HTTP request comprises an identifier. The identifier is a unique identifier that is unique to the HTTP request or unique to a transaction with which the HTTP request is associated, etc.

At 220, downstream computing node 285 performs the operation(s) corresponding to the HTTP request.

According to various embodiments, in response to performing the operation(s) corresponding to the HTTP request and obtaining (e.g., determining) the response for the operation(s), downstream computing node 285 provides the response to upstream computing node 280. At 230, downstream computing node 285 communicates the response over the primary communication channel. At 240, downstream computing node 285 stores the response to database 290 (e.g., in a table). The response is stored in database 290 in association with the identifier contained in or associated with the HTTP request. For example, upstream computing node 280 uses the identifier to perform a lookup to find a response to a particular operation/request.

According to various embodiments, the system (e.g., upstream computing node 280) performs 240 in response to determining that the communication of the response over the primary communication channel failed). In some embodiments, the system determines that obtaining a response for an operation over a primary communication channel failed based at least in part on one or more of (i) a time that has lapsed between when a parent node instructs/requests child node to perform an operation and a current time, (ii) an indication that a child node has communication problems, etc.

According to various embodiments, the system performs 230 and 240 contemporaneously such as in an attempt to obtain the response from the quicker of 230 or 240. In some embodiments, upstream computing node 280 polls the set of storage locations (e.g., in database 290) at periodic intervals, such as at a predetermined time period. Upstream computing node 280 uses the response it receives via the earlier of the primary communication channel or database 290 in connection with processing a transaction (e.g., the transaction with which the HTTP request is associated). In some embodiments, the response or result is stored in a memory or other storage device that is represented by database 290 in FIG. 2B. In some embodiments, downstream node 285 stores the response or results in an alternate storage location (e.g., not in database 290) that is pointed to by data stored in database 290.

Figure 3:
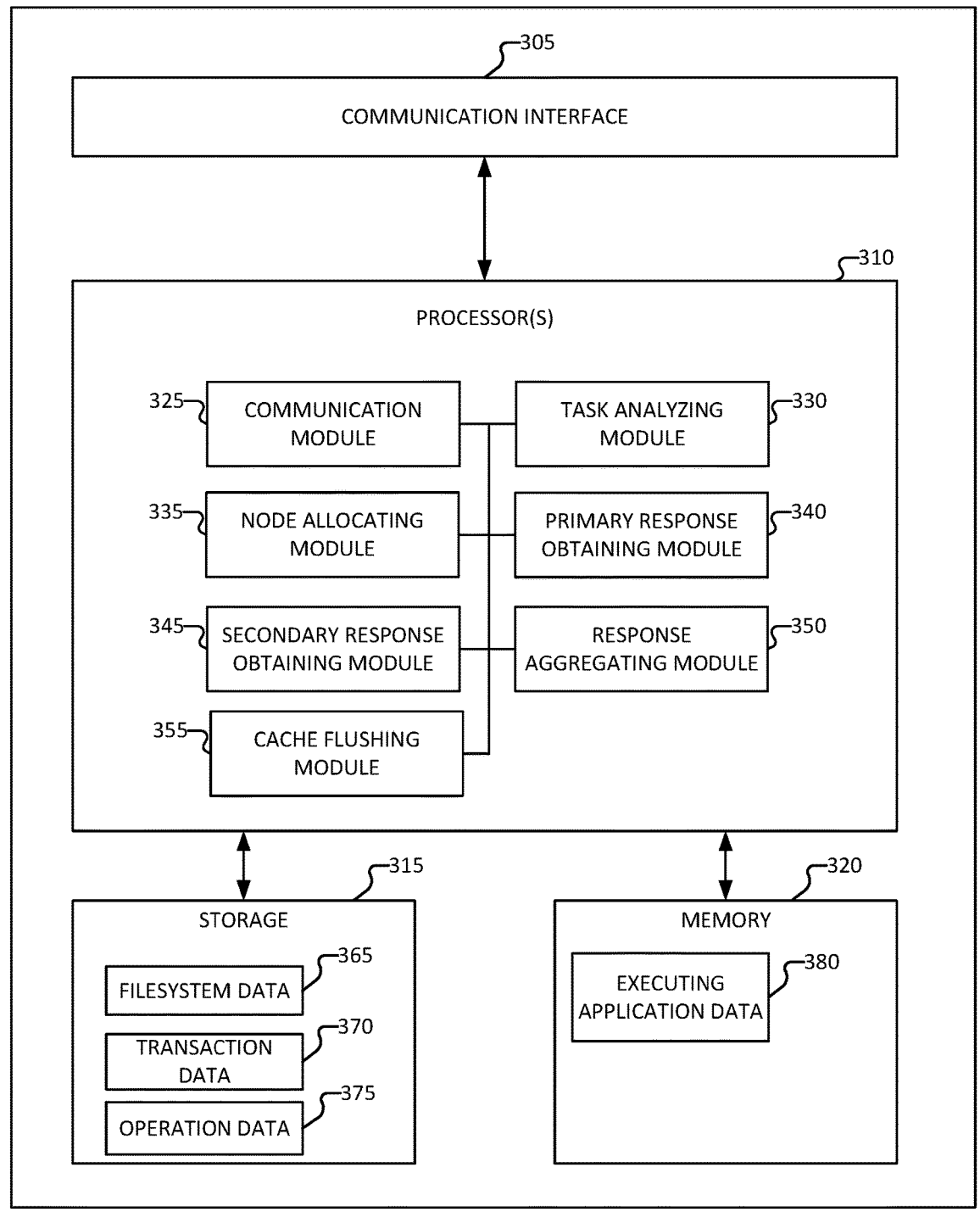
FIG. 3 is a block diagram of a parent node that services transactions according to various embodiments of the present application.

FIG. 3 is a block diagram of a parent node that services transactions according to various embodiments of the present application. In some embodiments, system 300 comprises or corresponds to at least part of service 110. System 300 may implement at least part of process system 300 implements a parent node.

In the example shown, system 300 implements one or more modules in connection with managing one or more features, providing access to the one or more features, and/or tracking (e.g., monitoring) use of the one or more features. System 300 comprises communication interface 305, one or more processors 310, storage 315, and/or memory 320. One or more processors 310 comprises one or more of communication module 325, task analyzing module 330, node allocating module 335, primary response obtaining module 340, secondary response obtaining module 345, response aggregating module 350, and/or cache flushing module 355.

In some embodiments, system 300 comprises communication module 325. System 300 uses communication module 325 to communicate with various other systems such as an application server, a data store, and/or client terminals or user systems such as a client system or an administrator system. For example, communication module 325 provides to communication interface 305 information that is to be communicated. As another example, communication interface 305 provides to communication module 325 information received by system 300. Communication module 325 is configured to receive one or more queries or requests to execute tasks such as from various client terminals or user systems, a file to store in data storage, a request to perform a transaction (e.g., generate a report, query a dataset, compute a result, etc.), a request to set one or more policies or threshold, etc. Communication module 325 is configured to provide to various compute nodes (e.g., child nodes) an instruction to perform an operation, such as an operation for which a response is used to determine a response to a transaction received by system 300. In connection with providing the instruction to perform the operation, system 300 uses communication module 325 to provide to the child node an identifier that corresponds to the operation. Communication module 325 is configured to receive a response for an operation from a compute node. For example, system 300 uses communication module 325 to receive a response for an operation via a primary communication channel. In response to a determination that obtaining a response for a particular operation over the corresponding primary communication channel has failed, system 300 determines to obtain the response is to be obtained from the predetermined storage location (or a storage location from a set of predetermined locations), and system 300 uses communication module 325 to check (e.g., query) the predetermined storage location for the response.

In some embodiments, system 300 comprises task analyzing module 330. System 300 uses task analyzing module 330 to obtain a transaction or a task corresponding to a transaction received via communication module 325. A task or operation corresponding to a transaction may be one of a set of tasks or operations that are performed and for which the results are used to determine a result for a transaction. In response to receiving the transaction/task (e.g., a request to perform a transaction), task analyzing module 330 determines a set of tasks or operations to perform in connection with performing the transaction. For example, the system determines the set of tasks or operations such that the system obtains a result for the transaction based at least in part on an aggregation (e.g., a compiling based on determined dependencies among the operations) of the respective results of the operations.

In some embodiments, system 300 comprises node allocating module 335. System 300 uses node allocating module 335 to determine a set of resources (e.g., compute resources) to use in connection with obtaining responses for the corresponding operations. In some embodiments, in response to receiving a request to perform a transaction, node allocating module 335 determines a set of resources to deploy to service the transaction (e.g., a set of child nodes to service corresponding tasks or operations), and node allocating module 335 spins up applicable resources if a set of currently available resources are not suitable or sufficient to perform the set of tasks or operations. According to various embodiments, the parent node uses a dependency mapping of resources/compute nodes to resources in connection with determining the set of resources to use to perform the set of tasks or operations. In some embodiments, node allocating module 335 determines a predetermined set of storage locations for the respective nodes of the set of resources to use in connection with providing responses for the corresponding set of tasks or operations. In response to determining the set of resources to deploy to service the transaction, node allocating module 335 communicates an instruction to perform a corresponding task or operation to the set of resources (e.g., a first instruction to perform a first task or operation of the set of tasks or operations is sent to a first node, a second instruction to perform a second task or operation of the set of tasks or operations is sent to a second node, etc.).

According to various embodiments, a task or an operation assigned to a child node is associated with an identifier (e.g., a transaction identifier, etc.). As an example, the identifier is a unique identifier across all tasks or operations or transactions within a system. As another example, the identifier is a globally unique identifier in a system (e.g., a distributed computing system). In some embodiments, the identifier is obtained (e.g., determined, generated, etc.) in connection with the assignment of a task or an operation to a node. In response to node allocating module 335 determining to allocate a task or an operation to a child node, system 300 obtains an identifier corresponding to the task or the operation. System 300 (e.g., node allocating module 335) provides the identifier corresponding to the task or operation to the child node, and the child node associates the identifier with a response to the task or the operation.

According to various embodiments, system 300 (e.g., node allocating module 335) uses one or more variables to determine a set of storage locations in which a corresponding node is to store a response for the task or the operation. The node to which the task or the operation is deployed is preconfigured to use the set of storage locations, or system 300 provides to the node an indication of the set of storage locations that the node is to use, such as in connection with system 300 providing to the node the instruction to perform the task or operation. Variables used in connection with determining the set of tasks or operations include a performance (e.g., time latency), a cost, a system resilience (e.g., how many redundancies are required or desired, etc.), and available technology (e.g., available types of storage). In some embodiments, system 300 implements a cost function with which to determine the set of storage locations (or an order in which the parent node checks the set of storage locations for a response). The cost function comprises a set of variables having a corresponding weighting (e.g., each variable may have its own corresponding weighting). In some embodiments, system 300 implements a default set of storage locations, and node allocating module 335 may determine to override the default set of storage locations in response to one or more criteria being satisfied. As an example, the one or more criteria may pertain to the size and/or shape of the request, a size and/or shape of an expected response for the request, a number of downstream dependencies on the result, etc.

In some embodiments, system 300 comprises primary response obtaining module 340. System 300 uses primary response obtaining module 340 to receive responses for a set of tasks or operations from a set of resources to which the set of tasks or operations are deployed. The primary communication channel is a channel that is established (e.g., by primary response obtaining module 340) between system 300 and the respective ones of the set of resources (e.g., the child nodes). System 300 and the set of resources may respectively establish the channel to communicate information therebetween such as an HTTP request, a response to an HTTP request, etc. In some embodiments, the primary communication channel is an encrypted channel.

In some embodiments, system 300 uses primary response obtaining module 340 to determine whether obtaining a response for a task or an operation (e.g., from a particular node to which the task or operation was allocated) over a primary communication channel failed. In some embodiments, primary response obtaining module 340 determines that obtaining a response for a task or an operation over a primary communication channel failed based at least in part on one or more of (i) a time that has lapsed between when system 300 instructs/requests child node to perform a task or an operation and a current time, (ii) an indication that a child node has communication problems, (iii) a status/state of the communication channel between system 300 and the child node, etc.

In some embodiments, system 300 comprises a secondary response obtaining module 345. System 300 uses secondary response obtaining module 345 to determine the set of locations associated with a task or an operation, and to check (e.g., query) the set of storage locations for the response. In some embodiments, secondary response obtaining module 345 determines the set of locations associated with the task or operation and/or checks the set of storage locations for a result or response in response to primary response obtaining module 340 determining that obtaining a response for a task or an operation over a primary communication channel has failed. In some embodiments, secondary response obtaining module 345 determines the set of locations associated with the operation and periodically checks the set of storage locations for the response according to a predetermined interval in connection with system 300 attempting to obtain a quicker response via the set of storage locations rather than via the primary communication channel.

According to various embodiments, system 300 (e.g., secondary response obtaining module 345) determines the set of locations associated with the task or operation based at least in part on performing a lookup with respect to a mapping of sets of storage locations to tasks or operations, a mapping of sets of storage locations to child nodes, a mapping of sets of storage locations to transactions (e.g., transaction to which a task or an operation corresponds), etc. In some embodiments, in response to determining to check the set of storage locations for the response, secondary response obtaining module 345 checks a plurality of the set of storage locations contemporaneously. For example, the parent node checks a subset or all of the set of storage locations in parallel. In some embodiments, in response to determining to check the set of storage locations for the response, secondary response obtaining module 345 checks for the response in the set of storage locations in a particular order. As an example, the particular order is predetermined (e.g., preset such as based on a set of rules or based on an administrator setting), or the particular order is determined based on an expectation (e.g., expected likelihood) that a response is stored in a particular storage location, etc.

In some embodiments, system 300 comprises response aggregating module 350. System 300 uses response aggregating module 350 to aggregate (e.g., roll up) responses for the set of tasks or operations corresponding to a transaction (or a task of a transaction) in order to determine a result/response for the transaction. Response aggregating module 350 determines whether responses for all tasks or operations comprised in the set of tasks or operations has been received, and in response to determining that responses for all such tasks or operations have been received, response aggregating module 350 aggregates the responses to determine the response for the corresponding transaction. As an example, system 300 stores a dependency mapping of tasks or operations and results therefor (as such tasks or operations and their corresponding results relate to the corresponding transaction), and response aggregating module 350 uses the dependency mapping to aggregate all the responses for the set of tasks or operations.

According to various embodiments, system 300 (e.g., response aggregating module 350) determines whether a particular transaction associated with the task or operation has timed out, and in response to determining that the transaction has timed out, system 300 determines to not aggregate the responses for the corresponding set of tasks or operations, and/or to not send a response to the transaction. As another example, system 300 determines that the transaction has timed out in response to determining that a current time is later than a threshold time limit for the transaction, or that a compute time has exceeded a threshold transaction time.

In some embodiments, system 300 comprises cache flushing module 355. System 300 uses cache flushing module 355 to flush (e.g., delete information pertaining to a response for a task or an operation from one or more storage locations used by a child node to store the response for the task or operation. In response to determining that the response for a task or an operation is to be deleted from the set of storage locations used by the corresponding node, cache flushing module 355 provides an instruction to the node or to the corresponding storage system to flush the response. Information stored by a child node in connection with a task or an operation (e.g., a response for the task or operation mapped to a corresponding identifier such as a transaction identifier, a task identifier, or an operation identifier, etc.) is maintained in the corresponding storage location (e.g., from among the set of storage locations) for sufficient time for system 300 (e.g., secondary response obtaining module 345) to obtain the information. In response to a determination that a predetermined time period has elapsed (e.g., since the information is stored by the child node), the information is deleted (e.g., flushed from the storage location). In some embodiments, the predetermined time period is set based at least in part on a time period within which a transaction is to be completed (e.g., a transaction with which the operation, or result for the operation, corresponds). As an example, the predetermined time period within which a transaction is to be completed is set based at least in part on a quality of service for the system or for the organization/customer associated with the transaction being processed by the system. In some embodiments, the response is deleted from at least one storage location in response to a determination that a transaction for which the first task or operation is performed is complete. In some embodiments, the response is maintained in at least one storage location for a predetermined caching period. As an example, the predetermined caching period is 24 hours.

According to various embodiments, storage 315 comprises one or more of filesystem data 365, transaction data 370, and/or operation data 375. Storage 315 comprises a shared storage (e.g., a network storage system) and/or database data, and/or user activity data. In some embodiments, filesystem data 365 comprises a database such as one or more datasets (e.g., one or more datasets for one or more files, etc.). Filesystem data 365 comprises data such as data generated in connection with managing files in a dataset, one or more policies or thresholds, historical information pertaining to performance or state of child nodes, etc. In some embodiments, transaction data 370 comprises information pertaining to a transaction received by system 300 for which the set of tasks or operations are deployed to the set of resources. For example, transaction data 370 comprises a mapping of tasks or operations to transactions, a dependency mapping of tasks or operations for a particular transaction, an indication of a subset of tasks or operations for which response(s) have been received, an indication of a subset of tasks or operations for which response(s) have not yet been received, etc. In some embodiments, operation data 375 comprises information pertaining to one or more tasks or operations deployed to a compute node (e.g., a child node). The information pertaining to the task or operation includes a type of task or operation, an expected response for the task or operation, a set of expected attributes for the expected response for the task or operation, a set of possible storage locations in which a compute node may store a response for a particular task or operation, an identifier for the task or operation or transaction, etc.

According to various embodiments, memory 320 comprises executing application data 380. Executing application data 380 comprises data obtained or used in connection with executing an application such as an application executing in connection with managing files stored on a dataset, querying information comprised in a dataset, etc. In some embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, etc.).

Figure 4:
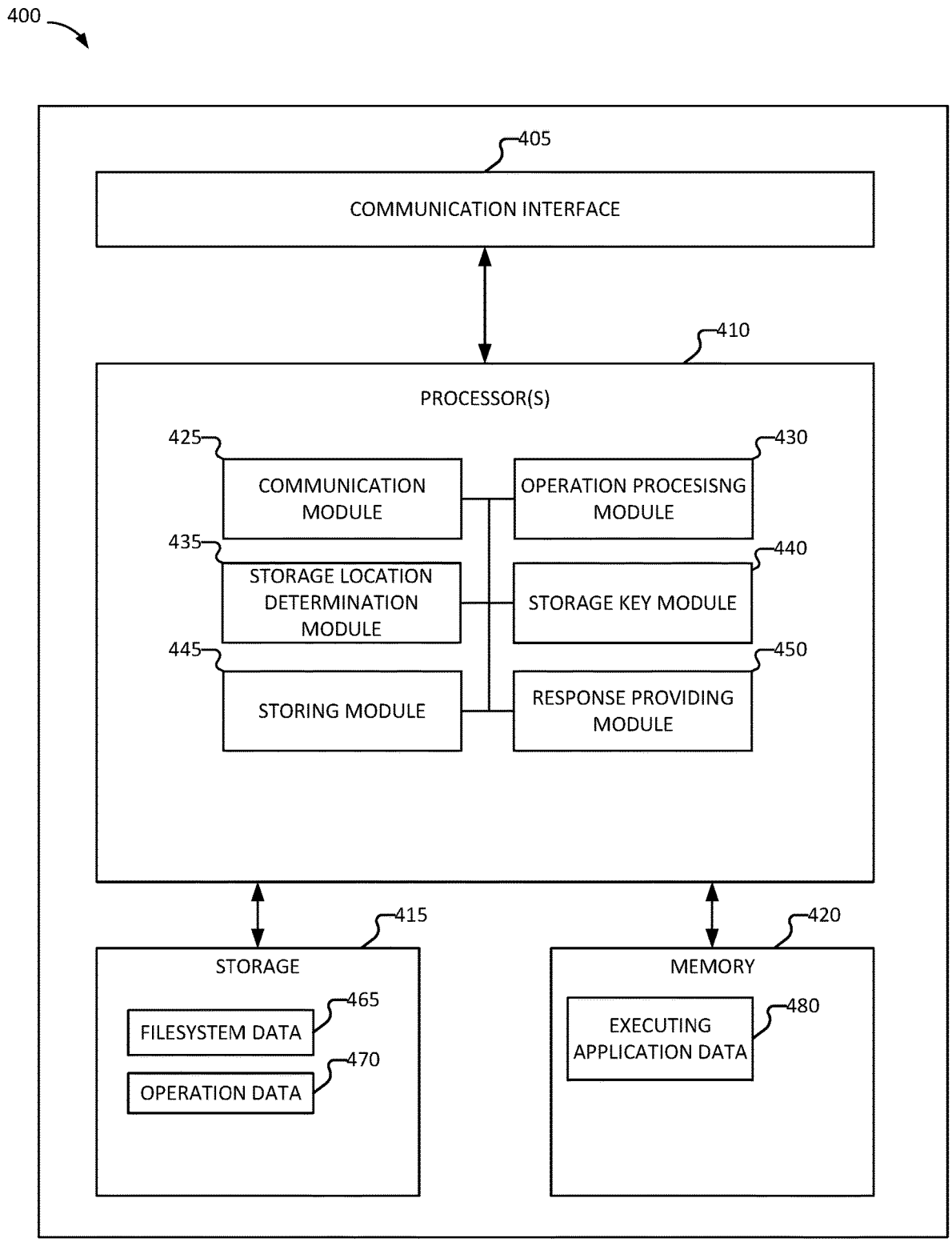
FIG. 4 is a block diagram of a child node that services operations according to various embodiments of the present application.

FIG. 4 is a block diagram of a child node that services operations according to various embodiments of the present application. In some embodiments, system 400 comprises or corresponds to at least part of service 110. System 400 may implement at least part of process system 300 implements a child node.

In the example shown, system 400 implements one or more modules in connection with managing one or more features, providing access to the one or more features, and/or tracking (e.g., monitoring) use of the one or more features. System 400 comprises communication interface 405, one or more processors 410, storage 415, and/or memory 420. One or more processors 410 comprises one or more of communication module 425, operation processing module 430, storage location determination module 435, storage key module 440, storing module 445, and/or response providing module 450.

In some embodiments, system 400 comprises communication module 425. System 400 uses communication module 425 to communicate with various other systems such as an application server, a data store, a parent node (e.g., system 300 of FIG. 3), and/or client terminals or user systems such as a client system or an administrator system. For example, communication module 425 provides to communication interface 405 information that is to be communicated. As another example, communication interface 405 provides to communication module 425 information received by system 400 such as an instruction to perform an operation, an identifier associated with an operation, a set of storage locations in which a response for an operation is to be stored, etc. Communication module 425 is configured to receive one or more queries or requests to perform an operation such as from a parent node, a request to set one or more policies or threshold, etc. Communication module 425 is configured to provide to a parent node a response for an operation. Communication module 425 is configured to receive a request to perform an operation from a parent node. For example, system 400 uses communication module 425 to receive a request to perform an operation via a primary communication channel.

In some embodiments, system 400 comprises an operation processing module 430. System 400 uses operation processing module 430 to perform the corresponding processing associated with a task or an operation in connection with obtaining (e.g., determining) a response for the task or operation. In response to determining that the processing is complete (e.g., that the response for the operation is obtained), system 400 provides (e.g., attempts to communicate) the response to the parent node via the primary communication channel.

In some embodiments, system 400 comprises a storage location determination module 435. System 400 uses storage location determination module 435 in connection with storing the response in at least one storage location of a predetermined set of storage locations. Storage location determination module 435 determines the at least one storage location contemporaneous with system 400 (e.g., response providing module 450) sending the response to the parent node via the primary communication channel. In some embodiments, storage location determination module 435 determines the at least one storage location in which to store the response based on one or more of (i) a set of predefined rules for determining storage locations, (ii) one or more attributes of the response (e.g., size, file type, etc.), (iii) a predetermined order provided by the parent node or system within which system 400 operates, (iv) a default order set in advance (e.g., advance of receiving the request to perform the operation) with respect to system 400, etc. In some embodiments, storage location determination module 435 determines to store the response in a storage location not comprised in the set of storage locations (e.g., the predetermined set of storage locations), and in response to determining to store (and/or storing module 445 storing) the response in such other storage location, system 400 (e.g., storage location determination module 435) uses communication module 425 to provide to the parent node (e.g., directly or via another node) an indication of such other storage location in which response is stored. In some embodiments, the indication of such other storage location in which the response is stored comprises a pointer stored in one or more of the set of storage locations received from the parent node so that a communication to the parent node to update a storage location is not required.

In some embodiments, system 400 comprises storage key module 440. System 400 uses storage key module 440 in connection with accessing the storage location(s) in which system 400 stores the response, or in connection with storing the response in the storage location(s). As an example, storage key module 440 uses a key or other element such as a node identifier, password, or other alphanumeric string for a system managing the storage location(s) to authenticate system 400 to determine whether to permit system 400 to store the response in the storage location(s). As another example, storage key module 440 uses a key, such as a key-pair shared between system 400 and a parent node, to encrypt the response (and the parent node uses the key pair to decrypt the response when the parent node obtains the response from the storage location(s)).

In some embodiments, system 400 comprises storing module 445. System 400 uses storing module 445 to store the response in the storage location(s) determined by storage location determination module 435. Storing module 445 stores the response in the at least one storage location contemporaneous with system 400 (e.g., response providing module 450) sending the response to the parent node via the primary communication channel. storing module 445 stores the response for the operation in association with (e.g., mapped to) the identifier corresponding to the operation, such as an identifier received in connection with the request to perform the operation at a location determined by storage location determination module 435.

In some embodiments, system 400 comprises response providing module 450. System 400 uses response providing module 450 to send the response to the applicable parent node via the primary communication channel. In some embodiments, in response to determining that the communication of the response via the primary communication channel fails, response providing module 450 attempts to resend the response via the primary communication channel. The response providing module 450 may attempt to send a response via the primary communication channel a threshold number of times before system 400 determines to timeout the operation.

According to various embodiments, storage 415 comprises one or more of filesystem data 465 and/or operation data 470. Storage 415 comprises a shared storage (e.g., a network storage system) and/or database data, and/or user activity data. In some embodiments, filesystem data 465 comprises a database such as one or more datasets (e.g., one or more datasets for one or more files, etc.). Filesystem data 465 comprises data such as data generated in connection with managing files in a dataset, one or more policies or thresholds, historical information pertaining to performance or state of child nodes, etc. In some embodiments, operation data 470 comprises information pertaining to one or more operations deployed to a compute node (e.g., a child node). The information pertaining to the operation includes a type of operation, an expected response for the operation, a set of expected attributes for the expected response for the operation, a set of possible storage locations in which system 400 may store a response for a particular operation, an identifier for the task or operation or transaction, etc.

According to various embodiments, memory 420 comprises executing application data 480. Executing application data 480 comprises data obtained or used in connection with executing an application such as an application executing in connection with managing files stored on a dataset, querying information comprised in a dataset, etc. In some embodiments, the application comprises one or more applications that perform one or more of receiving and/or executing a query or task, generating a report and/or configuration information that is responsive to an executed query or task, and/or providing to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, etc.).

Figure 5:
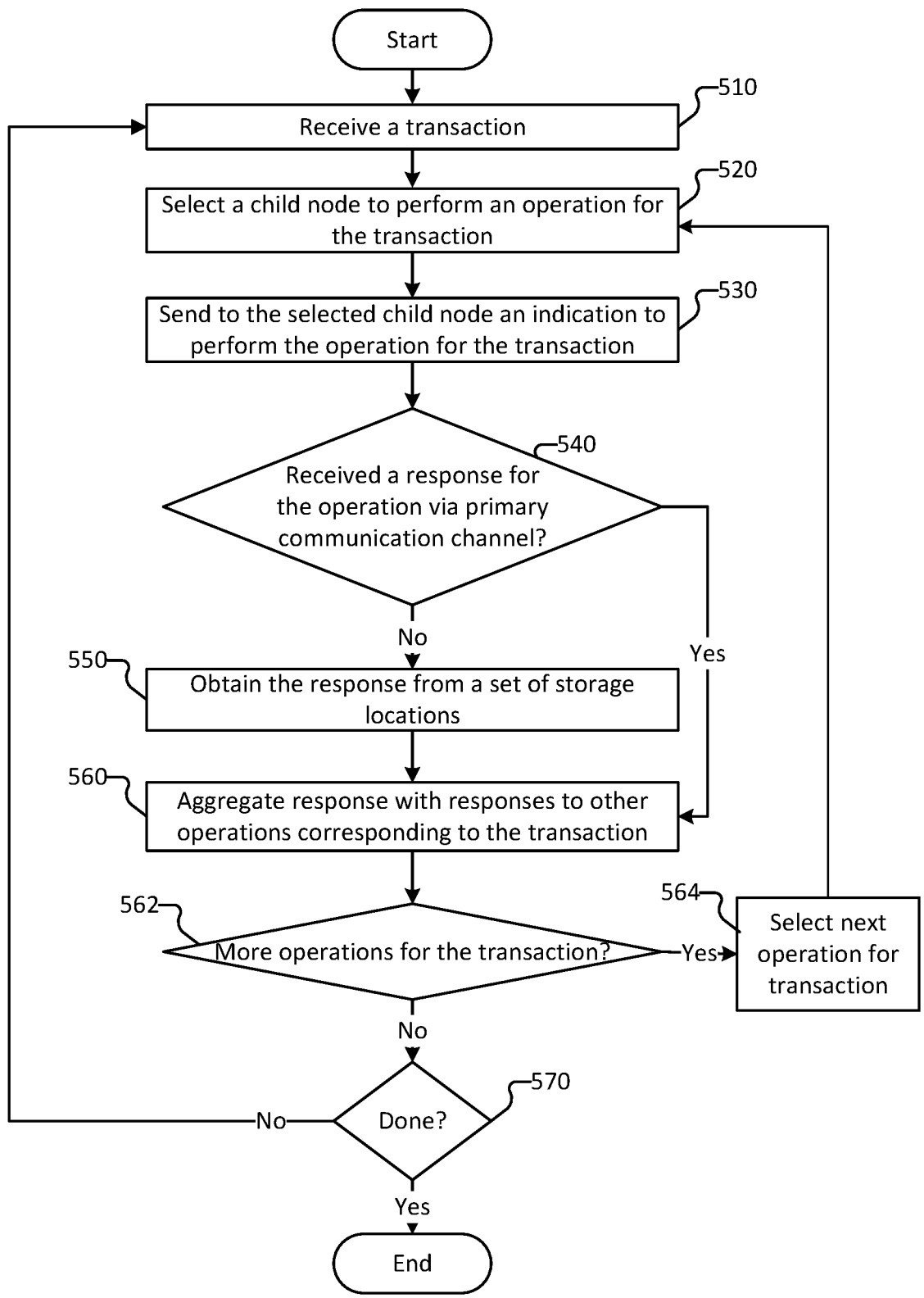
FIG. 5 is a diagram of a method for determining a response to an operation corresponding to a transaction according to various embodiments of the present application.

FIG. 5 is a diagram of a method for determining a response to an operation corresponding to a transaction according to various embodiments of the present application. In some embodiments, process 500 is implemented at least part by system 100 of FIG. 1, system 200 of FIG. 2A, system 275 of FIG. 2B, and/or system 300 of FIG. 3. Process 500 may be implemented in connection with process 600 of FIG. 6, and/or process 700 of FIG. 7.

At 510, a transaction is received. In some embodiments, the system receives a request to perform a transaction from a user system or another system that interfaces with the system such as via an API.

At 520, a child node is selected to perform an operation for the transaction. In response to determining that a transaction is received, the system determines a set of operations to perform the transaction and selects a child node to perform an operation of the set of operations associated with the transaction. According to various embodiments, the system uses a dependency mapping of resources/compute nodes to resources to determine a child node to use to perform the operation.

In some embodiments, the system determines the set of child nodes to perform the operations based at least in part on one or more of a type of operation comprised in the set of operations, a particular set of information impacted/invoked by an operation comprised in the set of operations, a number of operations in the set of operations, processing requirements of the set of operations, etc.

At 530, an indication to perform the operation for the transaction is sent to the selected child node. The system sends to a child node (e.g., comprised in the set of child nodes) the indication (e.g., a request) to perform the operation. As an example, the indication to perform the operation is comprised in an HTTP request communicated to the child node. In some embodiments, the indication to perform the operation comprises, or is communicated in connection with, an identifier associated with the operation and/or transaction. As an example, the identifier uniquely identifies the operation within the system. As another example, the identifier uniquely identifies within the system a transaction to which the operation corresponds.

At 540, a determination is performed to determine whether a response for the operation has been received via a primary communication channel. In some embodiments, the system determines whether the response for the operation has been received via a primary communication channel after a predefined period of time (e.g., a predetermined operation time threshold).

According to various embodiments, the system determines that obtaining a response for an operation over a primary communication channel has failed based at least in part on one or more of (i) a time that has lapsed between when a parent node instructs/requests child node to perform an operation and a current time, (ii) an indication that a child node has communication problems, etc. As an example, the system determines that obtaining the response for a particular operation over the corresponding primary communication channel has failed in response to a determination that the response has not been received (e.g., via the primary communication channel) within a predefined period of time (e.g., a predetermined operation time threshold). As another example, the system determines that obtaining the response for a particular operation over the corresponding primary communication channel has failed by determining that a child node has communication problems. In some embodiments, the child node is deemed to have communication problems based at least in part on historical information pertaining to communication of results related to historical operations. For example, if a child node had a previous problem performing a communication (e.g., a communication of one or more responses over a primary communication channel). In some embodiments, the child node is deemed to have a previous problem performing a communication if previous communications from the child node failed in excess of a predetermined threshold number of communication failures (e.g., at least a predetermined number of failures occurred within a threshold period of time).

In response to a determination that the response has not been received via the primary communication channel at 540, process 500 proceeds to 560. Conversely, in response to a determination that the response is not received via the primary communication channel at 540, process 500 proceeds to 550 at which a response is obtained from one or more of a set of storage locations. In response to determining to obtain the response from the set of storage locations, the system determines one or more storage locations of the set of storage locations to query for the response. In some embodiments, the system contemporaneously (e.g., in parallel) queries the one or more storage locations for the response. In some embodiments, the system queries a first subset of the one or more storage locations and a second subset of the one or more storage locations to retrieve the response. The system uses the identifier associated with the operation (or identifier associated with the transaction) to query a storage location for the response.

At 560, the response is aggregated with responses to other operation(s) corresponding to the task.

At 562, it is determined whether there are more operations for the transaction. In response to determining that there are more operations for the transaction, in 564 a next operation is selected for the transaction and control passes to 520. In response to determining that there are not more operations for the transaction, control passes to 570.

At 570, a determination is made as to whether process 500 is complete. In some embodiments, process 500 is determined to be complete in response to a determination that no further tasks or transactions are to be performed, no further requests to perform a task are received, performing the task timed out (e.g., a threshold amount of time for the task or the transaction has lapsed), a user has indicated that no further operations are to be performed, the user has exited the system, an administrator indicates that process 500 is to be paused or stopped, etc. In response to a determination that process 500 is complete, process 500 ends. In response to a determination that process 500 is not complete, process 500 returns to 510.

Figure 6:
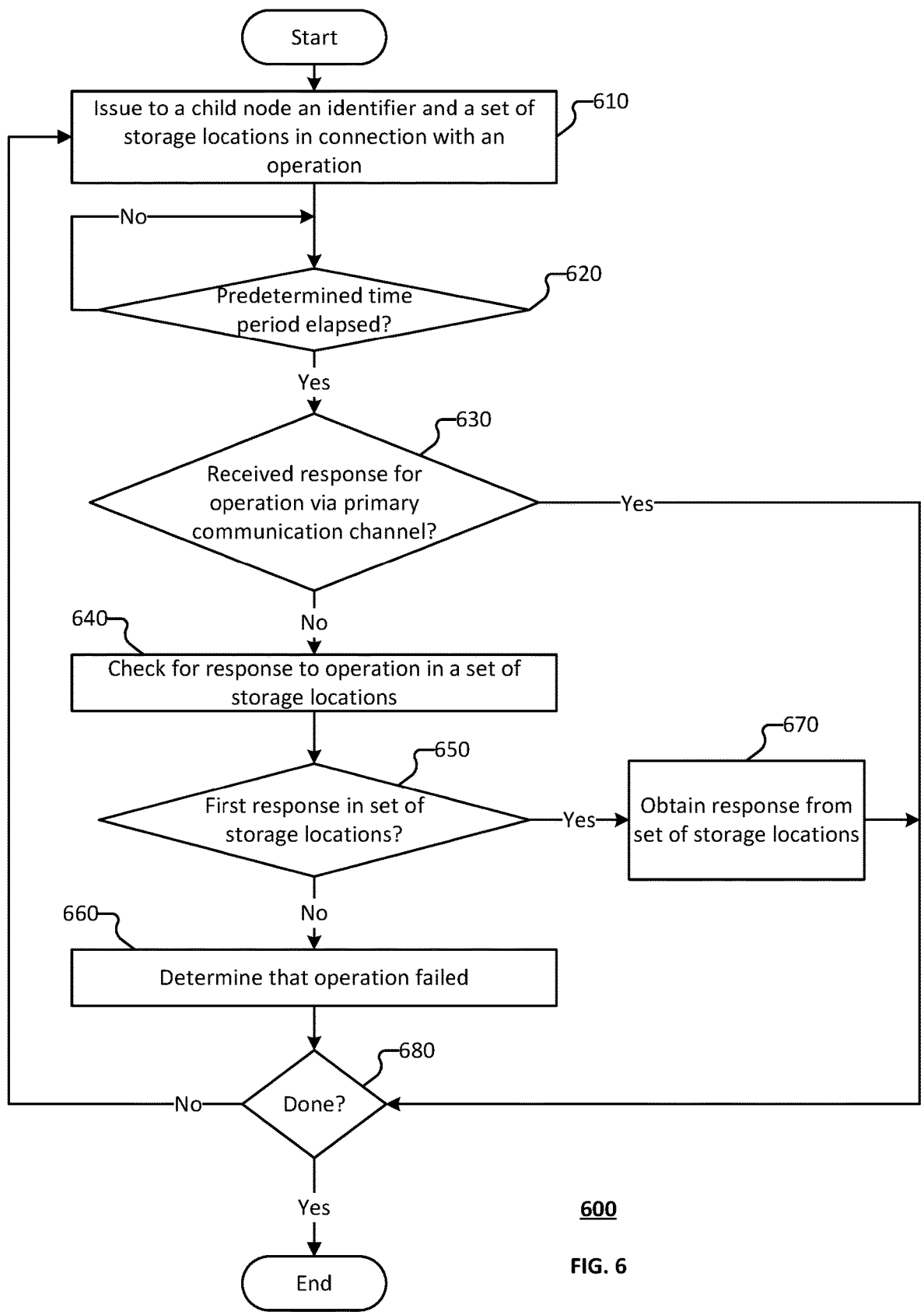
FIG. 6 is a diagram of a method for determining a response to an operation according to various embodiments of the present application.

FIG. 6 is a diagram of a method for determining a response to an operation according to various embodiments of the present application. In some embodiments, process 600 is implemented at least part by system 100 of FIG. 1, system 200 of FIG. 2A, system 275 of FIG. 2B, and/or system 300 of FIG. 3. Process 600 may be implemented in connection with process 500 of FIG. 5 and/or process 700 of FIG. 7.

At 610, an identifier and a set of storage locations is issued to a child node in connection with an operation. In some embodiments, the system communicates to the child node a request to perform the operation, and the request to perform the operation comprises, or is communicated in conjunction with, an identifier associated with the operation and a set of storage locations in which the child node is to store the response. As an example, the child node selects a storage location from among the set of storage locations to store a response to the operation.

At 620, a determination is made as to whether a predetermined time period has elapsed. In some embodiments, the predetermined time period is determined based at least in part on the first operation. In some embodiments, the predetermined time period is determined based on a time period threshold for a transaction with which the operation is associated, and/or a set of one or more other operations being, or to be, performed in connection with the transaction.

In response to determining that the predetermined time period has not elapsed at 620, process 600 iterates over 620 until the predetermined time period has elapsed. Conversely, in response to determining that the time period has elapsed at 620, process 600 proceeds to 630 at which a determination is performed to determine whether a response for the operation is received via a primary communication channel.

In response to determining that the response for the operation is not received via a primary communication channel at 630, process 600 proceeds to 640 at which a check is performed to determine whether the response is stored in the set of storage locations. In response to determining to obtain the response from the set of storage locations, the system determines one or more storage locations of the set of storage locations to query for the response. In some embodiments, the system contemporaneously (e.g., in parallel) queries the one or more storage locations for the response. In some embodiments, the system queries a first subset of the one or more storage locations and a second subset of the one or more storage locations the response. The system uses the identifier associated with the operation (or identifier associated with the transaction) to query a storage location for the response.

In response to a determination that the response is not stored in the set of storage locations at 650, process 600 proceeds to 660 at which the operation is determined to have failed. Thereafter, process 600 proceeds to 680. Conversely, if the response is determined to be stored in the storage locations at 650, process 600 proceeds to 670 at which the response is obtained from the set of storage locations. Thereafter, process 600 proceeds to 680.

In response to a determination that the response is received via the primary communication channel at 630, process 600 proceeds to 680.

At 680, a determination is made as to whether process 600 is complete. In some embodiments, process 600 is determined to be complete in response to a determination that no further operations are to be performed, no further requests to perform operations are to be communicated, a transaction has completed, performing the operation timed out (e.g., a parent node communicated an indication that the performing the operation has exceeded a threshold amount of time for the operation), a user has indicated that no further operations are to be performed, the user has exited the system, an administrator indicates that process 600 is to be paused or stopped, etc. In response to a determination that process 600 is complete, process 600 ends. In response to a determination that process 600 is not complete, process 600 returns to 610.

Figure 7:
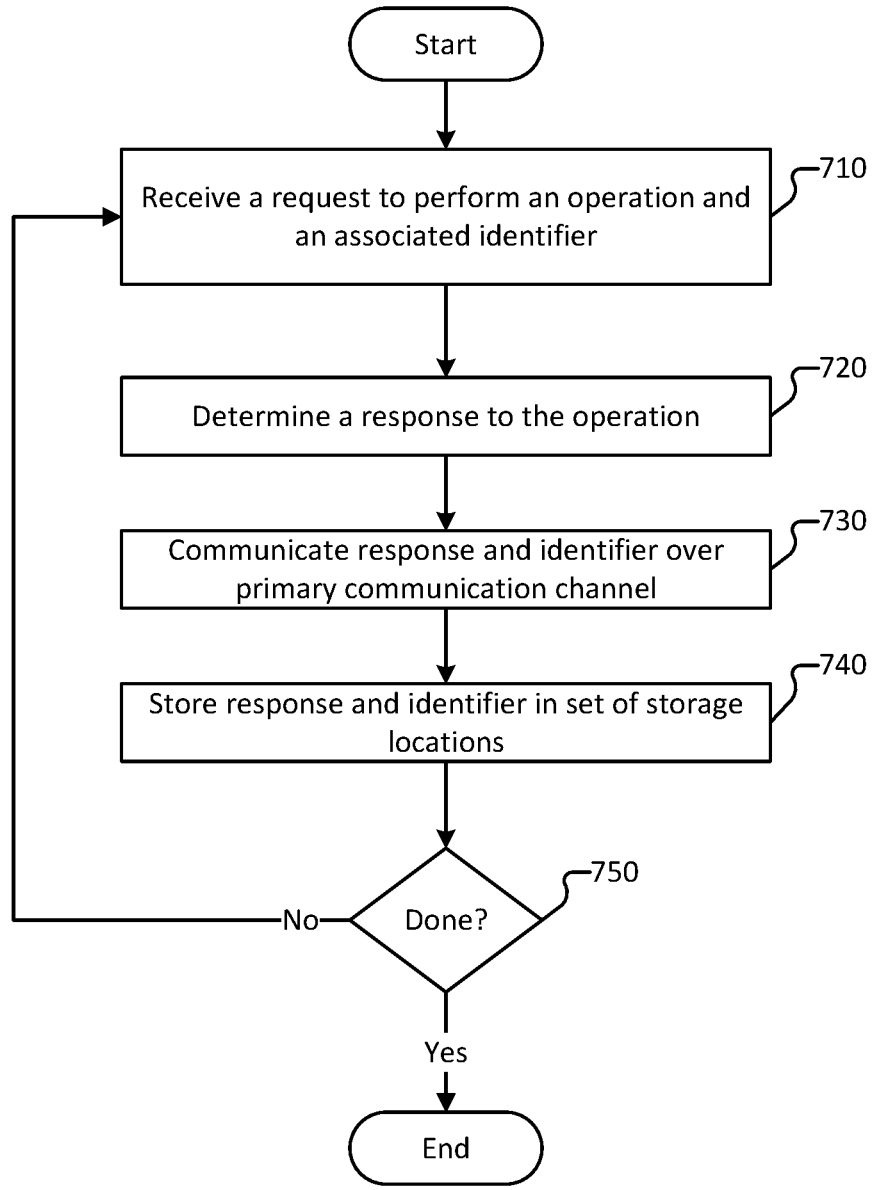
FIG. 7 is a diagram of a method for providing a response to an operation according to various embodiments of the present application.

FIG. 7 is a diagram of a method for providing a response to an operation according to various embodiments of the present application. In some embodiments, process 700 is implemented at least part by system 100 of FIG. 1, system 200 of FIG. 2A, system 275 of FIG. 2B, and/or system 400 of FIG. 4. Process 700 may be implemented in connection with process 500 of FIG. 5 and/or process 600 of FIG. 6.

At 710, a request to perform an operation and an associated identifier are received. In some embodiments, the identifier is associated with (e.g., mapped to) the request. In some embodiments, the identifier is associated with (e.g., mapped to) the operation. The request to perform the operation and an associated identifier is comprised in an HTTP request that the system receives from another system such as a parent node.

At 720, a response to the operation is determined. In some embodiments, in response to receiving the request to perform the operation, the system processes the operation to obtain a response for the operation.

At 730, the response and the identifier are communicated over a primary communication channel. In some embodiments, the system communicates the response in a HTTP message to another system (e.g., a parent node) from which the request to perform the operation is received.

At 740, the response and the identifier are stored in the set of storage locations. In some embodiments, the system stores the response in association with the identifier in at least one storage location selected from the set of storage locations. The system stores the response in at least one storage location contemporaneous with sending the response over the primary communication channel. For example, the system stores the response in at least one storage location simultaneously with sending the response over the primary communication channel.

At 750, a determination is made as to whether process 700 is complete. In some embodiments, process 700 is determined to be complete in response to a determination that no further operations are to be performed, no further requests to perform an operation are received, performing the operation timed out (e.g., a parent node communicated an indication that the performing the operation has exceeded a threshold amount of time for the operation), a user has indicated that no further operations are to be performed, the user has exited the system, an administrator indicates that process 700 is to be paused or stopped, etc. In response to a determination that process 700 is complete, process 700 ends. In response to a determination that process 700 is not complete, process 700 returns to 710.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   issuing, by a parent node to a child node, an identifier and a set of storage locations, the identifier and the set of storage locations being issued in connection with the parent node instructing the child node to perform an operation;
   determining, by the parent node, whether a response pertaining to the operation has been received from the child node within a predetermined period of time;
   in response to a determination that the parent node has not received the response from the child node within the predetermined period of time, checking, by the parent node, the set of storage locations for the response associated with the identifier; and
   in response to a determination that the response is stored in the set of storage locations, determining, by the parent node, a communication of the response from the child node failed.

2. A method, comprising:
   receiving, by a child node, an identifier and a set of storage locations, the identifier and the set of storage locations being received by the child node in connection with a parent node instructing the child node to perform an operation;
   performing, by the child node, the operation to obtain a response; and
   in response to obtaining the response,
      communicating the response to the parent node over a primary communication channel; and
      storing the response in at least one storage location, the response being stored in association with the identifier, wherein the parent node determines whether the response has been received from the child node within a predetermined period of time, wherein in response to a determination that the parent node has not received the response from the child node within the predetermined period of time, the parent node checks the set of storage locations for the response associated with the identifier, and wherein in response to a determination that the response is stored in the set of storage locations, the parent node determines a communication of the response from the child node failed.

3. A computer program product embodied in a non-transitory computer readable medium and comprising computer instructions for:
   issuing, by a parent node to a child node, an identifier and a set of storage locations, the identifier and the set of storage locations being issued in connection with the parent node instructing the child node to perform an operation;
   determining, by the parent node, whether a response pertaining to the operation has been received from the child node within a predetermined period of time;
   in response to a determination that the parent node has not received the response from the child node within the predetermined period of time, checking, by the parent node, the set of storage locations for the response associated with the identifier; and
   in response to a determination that the response is stored in the set of storage locations, determining, by the parent node, a communication of the response from the child node failed.

4. A system, comprising:
   at least two compute entities, comprising: a parent node and at least one child node,
   wherein:
      in connection with instructing a first child node of the at least one child node to perform a first operation, the parent node issues to the first child node an identifier and a set of storage locations;
      the first child node provides the parent node with a response to the first operation over a primary communication channel, and stores the response in at least one storage location of the set of storage locations, the response being stored in association with the identifier;
      in response to a determination that the parent node did not receive the response from the first child node within a predefined period of time, the parent node checks the set of storage locations for the response associated with the identifier; and
      in response to a determination that the response is stored in the set of storage locations, the parent node determines a communication of the response from the child node failed.

5. The system of claim 4, wherein the parent node checks the set of storage locations for the response associated with the identifier in a predetermined order.

6. The system of claim 4, wherein the parent node checks the set of storage locations for the response associated with the identifier in an order that is determined based at least in part on (i) an expected profile of the response, and (ii) one or more attributes associated with storage locations in the set of storage locations.

7. The system of claim 4, wherein the identifier comprises a transaction identifier.

8. The system of claim 4, wherein in response to a storage determination that storing the response to the at least one storage location fails, the first child node re-attempts to store the response to the at least one storage location.

9. The system of claim 4, wherein the first child node begins processing a subsequent operation in response to a confirmation determination that the response is stored in the at least one storage location without receiving confirmation from the parent node of receipt of the response.

10. The system of claim 4, wherein the parent node issues an instruction to perform the first operation to another child node of the at least one child node in response to determining that the parent node has not received the response within the predefined period of time, and that the response is not stored in the set of storage locations.

11. The system of claim 4, wherein the response is maintained in the at least one storage location for a predetermined caching period.

12. The system of claim 11, wherein the predetermined caching period is 24 hours.

13. The system of claim 4, wherein:
the parent node instructs the first child node to perform a second operation;
the parent node issues to the first child node a second identifier and a second set of storage locations corresponding to the second operation; and
the parent node obtains a second response to the second operation from the set of storage locations without waiting for a primary response over the primary communication channel based at least in part on a dead primary channel determination that the parent node did not receive the response to the first operation over the primary channel.

14. The system of claim 13, wherein the parent node determines to obtain the response to the second operation from the set of storage locations without waiting for the primary response over the primary communication channel in response to determining that the first child node is deemed to have communication problems.

15. The system of claim 14, wherein the first child node is deemed to have communication problems based at least in part on historical information pertaining to communication of results to historical operations.

16. The system of claim 4, wherein the at least one child node comprises a plurality of child nodes, and the parent node is configured to:
receive a transaction request;
determine a set of operations to be performed in connection with providing a transaction response to the transaction request;
obtain a dependency map of a plurality of child nodes and resources to provide an operation response to the set of operations;
determine a set of child nodes of the plurality of child nodes to which to send the set of operations based at least in part on the dependency map; and
communicate a set of instructions to respectively perform an operation in the set of operations to the set of child nodes.

17. The system of claim 4, wherein the response stored in the at least one storage location is accessible using a key pair that is shared between the parent node and the first child node.

18. The system of claim 4, wherein the response is deleted from the at least one storage location in response to the parent node providing an indication that the parent node no longer needs the response.

19. The system of claim 4, wherein the response is deleted from the at least one storage location in response to a completion determination that a transaction for which the first operation is performed is complete.

20. The system of claim 19, wherein the first operation times out of a predetermined maximum processing time for the transaction has lapsed before the first child node provides or stores the response.

* * * * *